US009751285B2

(12) United States Patent
Neuman et al.

(10) Patent No.: US 9,751,285 B2
(45) Date of Patent: Sep. 5, 2017

(54) BIODEGRADABLE SHEET

(71) Applicant: Tipa Corp. LTD, Hod Hasharon (IL)

(72) Inventors: Tal Neuman, Ramot Ha'shavim (IL); Daphna Nissenbaum, Ramot Ha'shavim (IL); Shai Garty, Rehovot (IL); Dori Pelled, Hod HaSharon (IL); Nili Konieczny, Tel Aviv (IL)

(73) Assignee: Tipa Corp. Ltd, Hod Hasharon (IL)

( * ) Notice: Subject to any disclaimer, the term of this patent is extended or adjusted under 35 U.S.C. 154(b) by 242 days.

(21) Appl. No.: 14/407,079

(22) PCT Filed: Jun. 13, 2013

(86) PCT No.: PCT/IL2013/050507
§ 371 (c)(1),
(2) Date: Dec. 11, 2014

(87) PCT Pub. No.: WO2013/186778
PCT Pub. Date: Dec. 19, 2013

(65) Prior Publication Data
US 2015/0174867 A1    Jun. 25, 2015

Related U.S. Application Data

(60) Provisional application No. 61/659,011, filed on Jun. 13, 2012.

(51) Int. Cl.
| B32B 27/08 | (2006.01) |
| B32B 7/10 | (2006.01) |
| B32B 27/18 | (2006.01) |
| B32B 27/36 | (2006.01) |
| B65D 65/46 | (2006.01) |
| B82Y 30/00 | (2011.01) |
| C08L 101/16 | (2006.01) |
| C08K 9/04 | (2006.01) |
| C08F 261/04 | (2006.01) |
| C08G 63/91 | (2006.01) |
| C08K 3/34 | (2006.01) |
| B65D 75/58 | (2006.01) |
| B65D 33/25 | (2006.01) |

(52) U.S. Cl.
CPC ............ B32B 27/08 (2013.01); B32B 7/10 (2013.01); B32B 27/18 (2013.01); B32B 27/36 (2013.01); B65D 65/46 (2013.01); B65D 65/463 (2013.01); B65D 65/466 (2013.01); B82Y 30/00 (2013.01); C08F 261/04 (2013.01); C08G 63/912 (2013.01); C08K 3/346 (2013.01); C08K 9/04 (2013.01); C08L 101/16 (2013.01); *B32B 2264/10* (2013.01); *B32B 2307/7163* (2013.01); *B32B 2307/7244* (2013.01); *B32B 2307/7265* (2013.01); *B32B 2439/70* (2013.01); *B65D 33/2508* (2013.01); *B65D 75/5805* (2013.01); *B65D 2575/586* (2013.01); *Y02W 90/12* (2015.05); *Y02W 90/13* (2015.05); *Y10T 428/31667* (2015.04); *Y10T 428/31794* (2015.04); *Y10T 428/31797* (2015.04)

(58) Field of Classification Search
CPC ....................................................... B32B 27/08
USPC ....................................................... 428/323
See application file for complete search history.

(56) References Cited

U.S. PATENT DOCUMENTS

| 5,044,512 A | 9/1991 | Giancaspro et al. |
| 5,506,046 A | 4/1996 | Andersen et al. |
| 5,756,194 A | 5/1998 | Shogren et al. |
| 5,883,199 A | 3/1999 | McCarthy et al. |
| 5,910,545 A | 6/1999 | Tsai et al. |
| 6,372,331 B1 | 4/2002 | Terada et al. |
| 6,422,753 B1 | 7/2002 | Thomas |
| 7,956,101 B2 | 6/2011 | Grossman |
| 8,420,746 B2 | 4/2013 | Huang et al. |
| 8,513,144 B2 | 8/2013 | Ting et al. |
| 2002/0052445 A1 | 5/2002 | Teradas et al. |
| 2003/0039775 A1 | 2/2003 | Kong |
| 2004/0068059 A1 | 4/2004 | Katayama et al. |
| 2005/0172812 A1 | 8/2005 | Ueda et al. |
| 2005/0244606 A1 | 11/2005 | Egawa |
| 2005/0288452 A1 | 12/2005 | Wakaki et al. |
| 2007/0191527 A1* | 8/2007 | Mallikarjuna ........... C08K 9/04 524/445 |
| 2008/0128382 A1 | 6/2008 | Yamamoto et al. |
| 2008/0147034 A1 | 6/2008 | Wang et al. |

(Continued)

FOREIGN PATENT DOCUMENTS

| CN | 104364081 | 2/2015 |
| JP | 2001-088261 | 4/2001 |

(Continued)

OTHER PUBLICATIONS

Derwent Abstract of Chiou et al (TW 477794 A), 2002.*
Steeves DM et al., "Investigation of polybutylene succinate-co-adipate (PBSA)/montmorillonite layered silicate (MLS) melt-processed nanocomposite." Journal of Biobased Materials and Bioenergy, vol. 1, No. 1, Apr. 30, 2007, pp. 94-108.
International Search Report of International Application No. PCT/IL2013/050507 dated Oct. 10, 2013.
Dean KM et al. "Formation of Highly oriented biodegradable polybutylene adipate nanocomposites: Effects of cation structures on morphology, free volume, and properties" Journal of Applied Polymer Scince, vol. 113, No. 6, Sep. 15, 2009, pp. 3716-3724, ISSN 0021-8995.

(Continued)

Primary Examiner — Doris Lee
(74) Attorney, Agent, or Firm — Pearl Cohen Zedek Latzer Baratz LLP

(57) ABSTRACT

Disclosed is a biodegradable sheet comprising at least one layer which comprises a biodegradable polymer and surface treated nanoclay particles or at least one layer which comprises PVOH grafted with a crosslinker and PBS or PBSA or a combination a biodegradable polymer and surface treated nanoclay particles and at least one layer which comprises PVOH grafted with a crosslinker and PBS or PBSA.

6 Claims, 24 Drawing Sheets

(56) References Cited

U.S. PATENT DOCUMENTS

| | | | |
|---|---|---|---|
| 2008/0311813 A1* | 12/2008 | Ting | B32B 7/12 |
| | | | 442/327 |
| 2009/0098395 A1 | 4/2009 | Lu et al. | |
| 2009/0162683 A1 | 6/2009 | Douard | |
| 2010/0249332 A1 | 9/2010 | Ferguson | |
| 2011/0135912 A1 | 6/2011 | Xu | |
| 2011/0171461 A1 | 7/2011 | Sanfilippo et al. | |
| 2012/0034444 A1 | 2/2012 | Chen et al. | |
| 2013/0087560 A1 | 4/2013 | Neuman et al. | |
| 2014/0329039 A1 | 11/2014 | Neuman et al. | |

FOREIGN PATENT DOCUMENTS

| | | |
|---|---|---|
| JP | 2005154524 | 6/2005 |
| JP | 2006-206670 | 8/2006 |
| WO | WO 01/87566 | 11/2001 |
| WO | WO 03/055792 | 7/2003 |
| WO | WO-2005/063881 | 7/2005 |
| WO | WO 2008/157158 | 12/2008 |
| WO | WO-2008/157158 | 2/2009 |
| WO | WO-2009/073197 | 6/2009 |
| WO | WO 2009/073197 | 6/2009 |
| WO | WO 2009/098463 | 8/2009 |
| WO | WO 2009-098463 | 8/2009 |
| WO | WO-2011/054892 | 5/2011 |
| WO | WO 2011/054892 | 5/2011 |
| WO | WO-2011/110750 | 9/2011 |
| WO | WO 2011/110750 | 9/2011 |
| WO | WO-2011/123682 | 10/2011 |
| WO | WO 2011/123682 | 10/2011 |
| WO | WO-2011/158240 | 12/2011 |
| WO | WO 2011/158240 | 12/2011 |
| WO | WO-2013/088443 | 6/2013 |
| WO | WO 2013/088443 | 6/2013 |
| WO | WO 2013/186778 | 12/2013 |
| WO | WO 2015/059709 | 4/2015 |

OTHER PUBLICATIONS

Laverde GV et al. "Analysis of the mechanical properties of biodegradable films made from blends of polylactic acid (PLA) and polyesters by blown film extrusion" Conference Proceedings at ANTEC 98: Plastics on My Mind, vol. 1-3, 44, Apr. 30, 1998, pp. 2515-2519.

Steeves DM et al. "Investigation of polybutylene succinate-co-adipate (PBSA)/monomorillonite layered silicate (MLS) melt-processed nanocomposites" Journal of Biobased Materials and Bioenergy, vol. 1, No. 1, pp. 94-108, ISSN 1556-6560, Apr. 30, 2007.

* cited by examiner

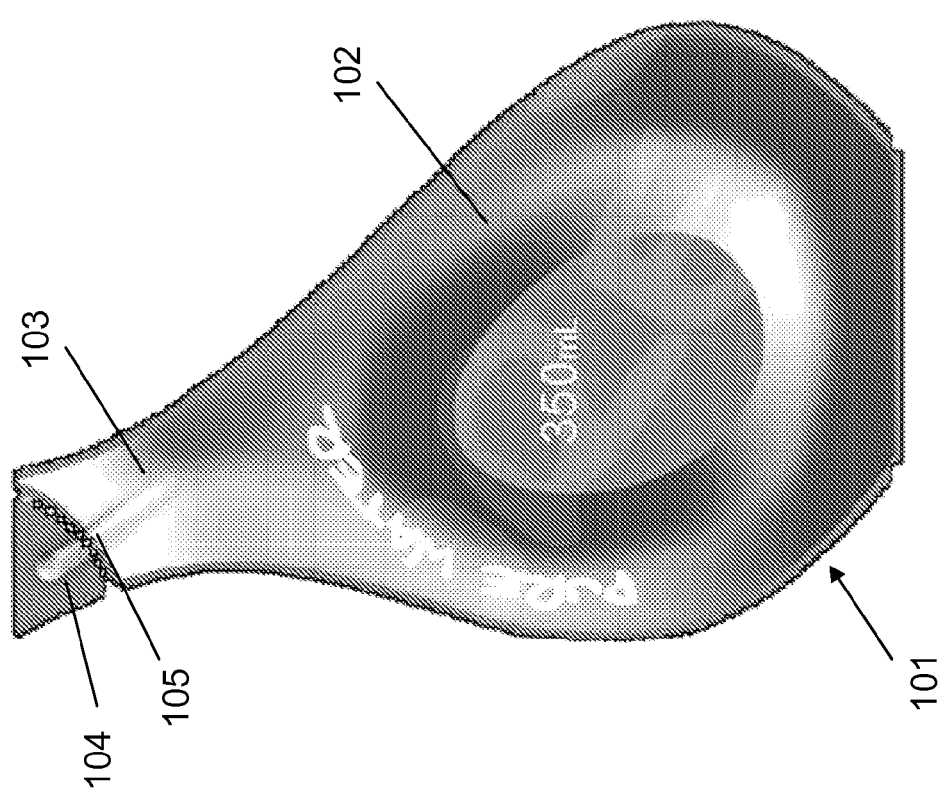

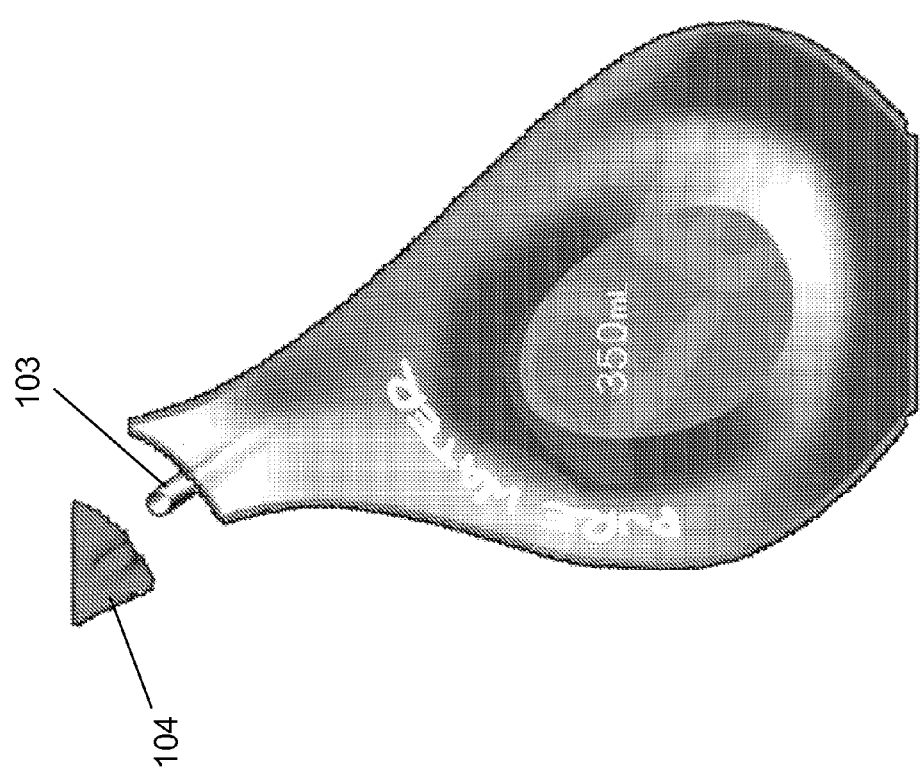

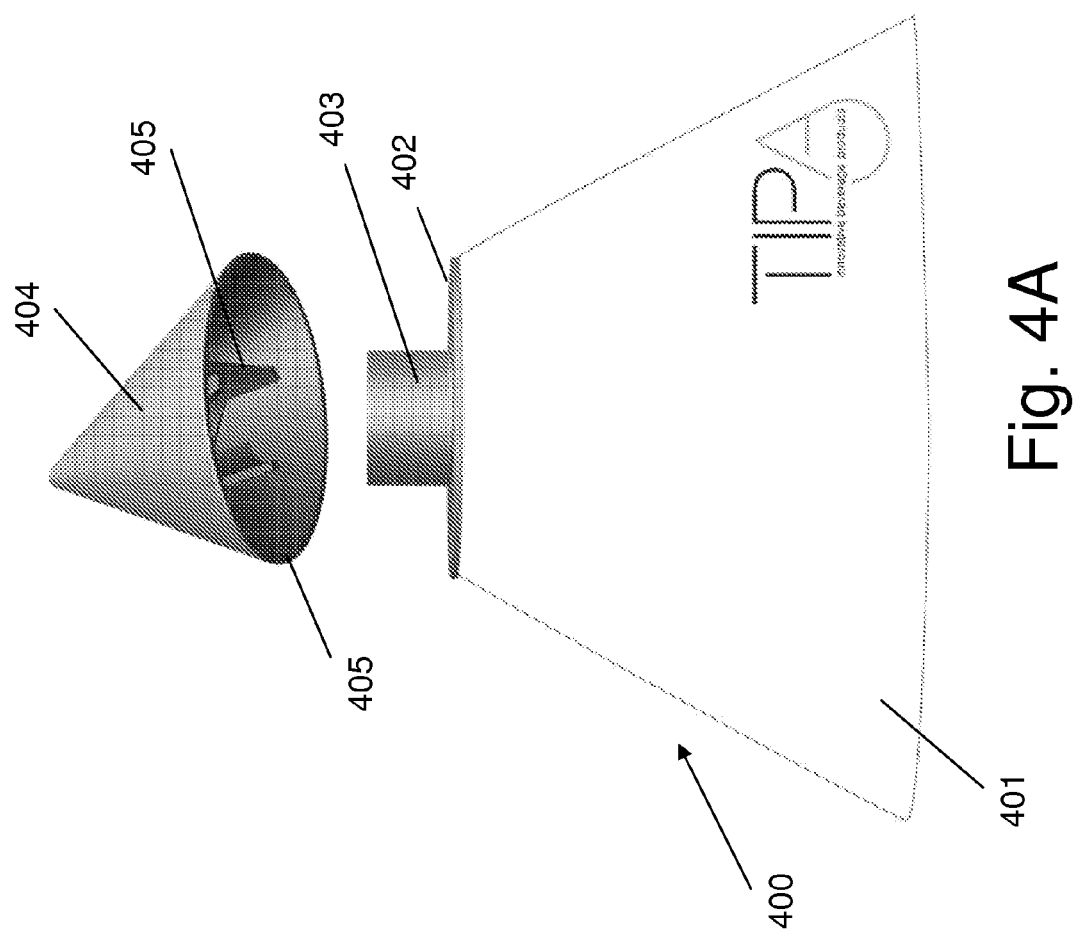

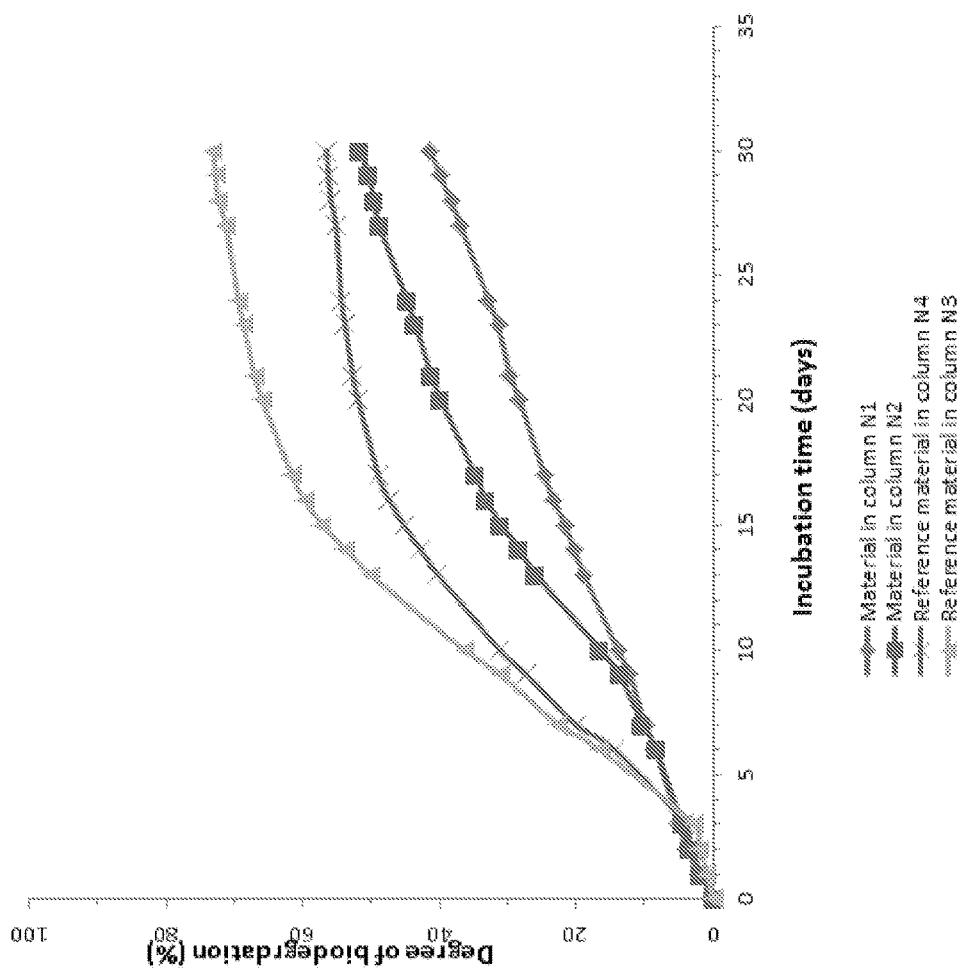

BIODEGRADABLE SHEET

CROSS-REFERENCE TO RELATED APPLICATIONS

This application is a National Phase Application of PCT International Application No. PCT/IL2013/050507, International Filing Date Jun. 13, 2013, claiming the benefit of US Provisional Patent Application No. 61/659,011, filed Jun. 13, 2012, which are both hereby incorporated by reference.

FIELD OF THE INVENTION

This invention is directed to a composition for biodegradable sheets comprising a gas and/or water barrier material. The invention relates to the use of nanoclays and/or PVOH as gas barriers.

BACKGROUND OF THE INVENTION

The use of biodegradable materials has grown over the past years due to the biodegradable materials' environmentally friendly properties. The use of such materials is widespread and includes various types of plastic bags, diapers, balloons and even sunscreen. In response to the demand for more environmentally friendly packaging materials, a number of new biopolymers have been developed that have been shown to biodegrade when discarded into the environment. Some of the larger players in the biodegradable plastics market include such well-known chemical companies as DuPont, BASF, Cargill-Dow Polymers, Union Carbide, Bayer, Monsanto, Mitsui and Eastman Chemical. Each of these companies has developed one or more classes or types of biopolymers. For example, both BASF and Eastman Chemical have developed biopolymers known as "aliphatic-aromatic" copolymers, sold under the trade names ECOFLEX and EASTAR BIO, respectively. Bayer has developed polyesteramides under the trade name BAK. Du Pont has developed BIOMAX, a modified polyethylene terephthalate (PET). Cargill-Dow has sold a variety of biopolymers based on polylactic acid (PLA). Monsanto developed a class of polymers known as polyhydroxyalkanoates (PHA), which include polyhydroxybutyrates (PHB), polyhydroxyvalerates (PHV), and polyhydroxybutyrate-hydroxyvalerate copolymers (PHBV). Union Carbide manufactures polycaprolactone (PCL) under the trade name TONE.

Each of the foregoing biopolymers has unique properties, benefits and weaknesses. For example, biopolymers such as BIOMAX, BAK, PHB and PLA tend to be strong but are also quite rigid or even brittle. This makes them poor candidates when flexible sheets or films are desired, such as for use in making wraps, bags and other packaging materials requiring good bend and folding capability. In the case of BIOMAX, DuPont does not presently provide specifications or conditions suitable for blowing films therefrom, thus indicating that it may not be presently believed that films can be blown from BIOMAX and similar polymers.

On the other hand, biopolymers such as PHBV, ECOFLEX and EASTAR BIO are many times more flexible compared to the more rigid biopolymers discussed above. However, they have relatively low melting points such that they tend to be self adhering and unstable when newly processed and/or exposed to heat. To prevent self-adhesion (or "blocking") of such films, it is typically necessary to incorporate a small amount (e.g. 0.15% by weight) of silica, talc or other fillers.

Further, due to the limited number of biodegradable polymers, it is often difficult, or even impossible, to identify one single polymer or copolymer that meets all, or even most, of the desired performance criteria for a given application. For these and other reasons, biodegradable polymers are not as widely used in the area of food packaging materials, particularly in the field of liquid receptacles, as desired for ecological reasons.

In addition, the biodegradable sheets known today are mostly opaque, having low light transmittance and high haze. Further, the known biodegradable sheets either do not include barriers or include amounts and types of barriers that cause the sheets to be generally highly permeable to gases, having both a high oxygen transmission rate and a high water vapor transmission rate, and thus they cannot serve as long term food or drink receptacles. Additionally, the physical strength of known biodegradable sheets, measured by parameters such as stress at maximum load, strain at break and Young's Modulus, is lacking and, therefore, is deficient when used as packaging, particularly when it is desirable to package liquids.

Therefore, there is a need in the art for a biodegradable sheet that is physically strong, though flexible, and further, has low gas permeability, a high light transmittance and low haze. Such a biodegradable sheet could be used as a long term receptacle.

Further, although many liquid receptacles are used in the food and drink industry, biodegradable receptacles are not widely used. U.S. Pat. No. 6,422,753 discloses a separable beverage receptacle packaging for potable and freezable liquids, wherein the packaging comprises a plurality of individual beverage receptacle units aligned in a side by side fashion relative to one another. Each beverage receptacle unit has an interior fluid chamber defined by a lower heat weld, an upper heat weld and two vertical heat welds that are formed on opposed sheets of plastic. The heat welds between the intermediate beverage receptacle units are provided with perforated strips and the upper end of each receptacle unit is provided with an upper horizontal heat weld disposed above a tapered crimp with a gap that defines an integral drinking solubility spout when the tear strip above the perforated line is removed from the individual beverage receptacle units. However, this packaging is not environmental friendly.

U.S. Pat. No. 5,756,194 discloses water-resistant starch products useful in the food industry that comprise an inner core of gelatinized starch, an intermediate layer of natural resin and an outer layer of water resistant biodegradable polyester. The gelatinized starch can be made water-resistant by coating with biodegradable polyesters such as poly(beta-hydroxybutyrate-co-valerate) (PHBV), poly(lactic acid) (PLA), and poly(epsilon-caprolactone) (PCL). Adherence of the two dissimilar materials is achieved through the use of an intervening layer of a resinous material such as shellac or rosin which possesses a solubility parameter (hydrophobicity) intermediate to that of the starch and the polyesters. Coating is achieved by spraying an alcoholic solution of the shellac or rosin onto the starch-based article and subsequently coating with a solution of the polyester in an appropriate solvent. However, these products are not optimally designed for allowing a user to carry them easily while being in a physical activity. In addition, they are not designed to provide different liquid volumes that can be consumed according to instant needs.

All of the aforementioned prior art constructions are deficient with respect to their failure to provide a simple, efficient, and practical packaging arrangement for liquids

SUMMARY OF THE INVENTION

In one embodiment of the invention, there is provided a multilayered biodegradable sheet, wherein at least one layer comprises at least one biodegradable polymer and surface treated nanoclay particles. In some embodiments, the multilayered biodegradable sheet comprises a bridge between the surface treated nanoclay particles and the biodegradable polymer, the bridge comprising a functional moiety having at least two functional sites, wherein at least one of the functional sites is conjugated to the nanoclay surface and at least another one of the functional sites is conjugated to the biodegradable polymer. In some embodiments of the invention, the multilayered biodegradable sheet comprises a bridge between the surface treated nanoclay particles and the biodegradable polymer, the bridge having a first end and a second end and comprising a plurality of functional moieties, each functional moiety having at least two functional sites, wherein at least one of the functional sites of one of the moieties on the first end of the bridge is conjugated to the nanoclay surface and at least one of the functional sites of another moiety on the second end of the bridge is conjugated to the biodegradable polymer, and wherein the functional moieties are conjugated to one another between the first and second ends of the bridge. In some embodiments of the invention, the surface treated nanoclay particles are a nanoclay concentrate. According to some embodiments, the nanoclay particles are 1-30% w/w of a nanoclay concentrate. In some embodiments of the invention, the nanoclay concentrate was prepared by ring opening polymerization (ROP), wherein the ROP includes polymerizing ring bearing monomers selected from L-lactide, D-lactide, D,L-lactide and epsilon-caprolacton or a combination thereof.

In some embodiments of the invention, the surface treated nanoclay particles were pretreated to remove ions adsorbed on the surface of the nanoclay particles. In some embodiments of the invention, the functional moiety is 3-(dimethylamino)-1-propylamine (DMPA), a diisocyanante group, triethoxysilane substituted with an isocyanate group, aminopropyl triethoxysilane or any combination thereof. In some embodiments of the invention, the functional moiety comprises a functional group selected from the group consisting of a di-aldehyde selected from gluteraldehyde, diacrylate, meta-acrylate, or di-epoxide, or a diisocyanate group is selected from hexamethylene diisocyanate (HDI), methylene diphenyl diisocyanate (MDI) and toluene diisocyanate (TDI).

In some embodiments of the invention, there is provided a multilayered biodegradable sheet, wherein at least one layer comprises at least one biodegradable polymer and surface treated nanoclay particles, wherein the surface treated nanoclay particles are homogeneously dispersed in the at least one layer comprises at least one biodegradable polymer and surface treated nanoclay particles.

In some embodiments of the invention, there is a multilayered biodegradable sheet, wherein at least one layer comprises PVOH grafted and PBS or PBSA with a crosslinker. The w/w ratio between PVOH, the cross linker and PBS or PBSA is typically 10-90%:0.1-10%:90-10%.

In an embodiment of the invention, there is provided a multilayered biodegradable sheet, wherein at least one layer comprises at least one biodegradable polymer and surface treated nanoclay particles wherein the multilayered biodegradable sheet further comprising at least one layer that comprises PVOH grafted and PBS or PBSA with crosslinker, which may be MAH. According to some embodiments the grafted PVOH is in a separate layer from the surface treated nanoclay particles. In some embodiments, the w/w ratio between PVOH, the crosslinker and PBS/PBSA is 10-90%:0.1-10%:90-10%

In some embodiments of the invention, there is provided a single layered biodegradable sheet comprising at least one biodegradable polymer and surface treated nanoclay particles.

In other embodiments, there is provided a single layered biodegradable sheet comprising PVOH grafted with a cross linker and PBS or PBSA.

The multilayered biodegradable sheet of the invention may typically comprise 2, 3, 4, 5, 6, or 7 layers.

In some embodiments, there is provided a method of preparing a PVOH grafted and PBS or PBSA with a cross linker comprising the step of blending dried PBS or PBSA and PVOH with the cross linker and a radical initiator. The method may further comprise a step of pelletizing the blended dried PBS or PBSA and PVOH the crosslinker and the radical initiator. The radical initiator may be peroxide and azo- group free radical former. In some embodiments, the radial initiator is benzoyl peroxide (BPO), lauroyl peroxide (LP), azobisisobutyronitrile (AIBN), or Azobis(cyanocyclohexane), (ACHN) or any combination thereof.

The method may further comprising the step of drying the blended dried PBS or PBSA and PVOH with the cross linker and the radical initiator or the pellet thereof.

In some embodiments, there is provided a method of preparing surface treated nanoclay particles, said method comprising: reacting nanoclay particles with a functional moiety comprising at least two functional sites, leaving at least one free functional site for further reaction; and reacting said at least one free functional site with a biodegradable polymer.

According to some embodiments, there is provided a method of preparing surface treated nanoclay particles, said method comprising: reacting nanoclay particles with a plurality of functional moieties, each comprising at least two functional sites, such that at least one functional site ties at least one functional moiety to said nanoclay particle and at least a second functional site on the same functional moiety ties to an additional functional moiety, which is attached to any remaining functional moieties, leaving at least one free functional site; and reacting said free functional site with a biodegradable polymer.

The method may further comprise pretreating the nanoclay particles with an acid, prior to the reaction thereof with a functional moiety.

According to some embodiments, there is provided a method of preparing surface treated nanoclay particles, the method comprising: mixing the nanoclay particles in a solution of at least one ring-bearing monomer; and initiating a ring opening polymerization reaction between the nanoclay particles and the monomers, such that polymeric brushes are formed on the surface of the nanoclay particles. The step of mixing may include creating a dispersion of the nanoclay particles in a solution of at least one ring-bearing or double-bond or epoxide or di-amine monomer. In some embodiments of the invention, the ring opening polymerization reaction includes the use of a catalyst. In some embodiments of the invention, the ring opening polymerization reaction includes heating.

The crosslinker used is typically selected from the group consisting of 1,4-Butanediol dimethacrylate, hexamethylene dimethacrylate, maleic anhydride, polyethylene glycol-dimethacrylate, and polycaprolactone dimethacrylate or any combination thereof.

According to some embodiments of the invention, the multilayered biodegradable sheet comprises the following:
Layer 1: consisting about 25% w/w PLA and about 75% w/w PBSA or PBS;
Layer 2: consisting of about 100% w/w PVOH, grafted with PBSA or PBS;
Layer 3: consisting of about 98-85% PBSA and about 2-15% w/w and surface treated nanoclay particles;
Layer 4: consisting of about 100% w/w PVOH grafted with PBSA or PBS;
Layer 5: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 100% w/w PVOH w/ or w/o a crosslinker;
Layer 3: consisting of about 98-85% PBSA and about 2-15% w/w and surface treated nanoclay particles;
Layer 4: consisting of about 100% w/w PVOH w/ or w/o a crosslinker;
Layer 5: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 100% w/w PVOH, grafted with PBSA or PBS;
Layer 3: consisting of about 98-85% PBSA and about 2-15% w/w and surface treated nanoclay particles;
Layer 4: consisting of about 100% w/w PVOH grafted with PBSA or PBS;
Layer 5: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 98-85% PBSA and about 2-15% w/w and surface treated nanoclay particles;
Layer 3: consisting of about 100% w/w PVOH w/ or w/o a crosslinker;
Layer 4: consisting of about 98-85% PBSA and about 2-15% w/w and surface treated nanoclay particles;
Layer 5: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 100% grafted PBSA or PBS;
Layer 3: consisting of about 100% PVOH w/ or w/o a crosslinker;
Layer 4: consisting of about 100% grafted PBSA or PBS;
Layer 5: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 100% grafted PVOH with PBSA or PBS;
Layer 3: consisting of about 100% PVOH w/or w/o a crosslinker;
Layer 4: consisting of about 100% grafted PVOH with PBSA or PBS;
Layer 5: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA;
Layer 2: consisting of about 100% grafted PVOH with PBS;
Layer 3: consisting of about 100% PVOH w/or w/o a crosslinker;
Layer 4: consisting of about 100% grafted PVOH with PBS;
Layer 5: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 100% w/w PVOH, grafted with PBSA or PBS;
Layer 3: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 100% w/w PVOH w/ or w/o a crosslinker;
Layer 3: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 98-85% PBSA and about 2-15% w/w and surface treated nanoclay particles;
Layer 3: consisting of about w/ or w/o 25% w/w PLA and about 75% or 100% w/w PBSA or PBS or PBAT.

According to some embodiments of the invention, the multilayered biodegradable sheet comprises the following:
Layer 1: consisting about 25% w/w PLA and about 75% w/w PBSA or PBS;
Layer 2: consisting of about 98-85% w/w PVOH, grafted with PBSA or PBS and about 2-15% w/w and surface treated nanoclay particles;
Layer 3: consisting of about w/ or w/o 25% w/w PLA and about 75% or 100% w/w PBSA or PBS or PBAT.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 2A illustrates the layout of a single receptacle units, according to an embodiment of the invention;

FIGS. 2B and 2C illustrate using a single receptacle units, according to another embodiment of the invention;

FIGS. 4A to 4C illustrate the layout of a single receptacle units with a mating cover, according to another embodiment of the invention;

FIG. 8 is a graph showing the biodegradability of a three layered sheet prepared according to an embodiment of the invention;

DETAILED DESCRIPTION OF THE INVENTION

Figure 1:
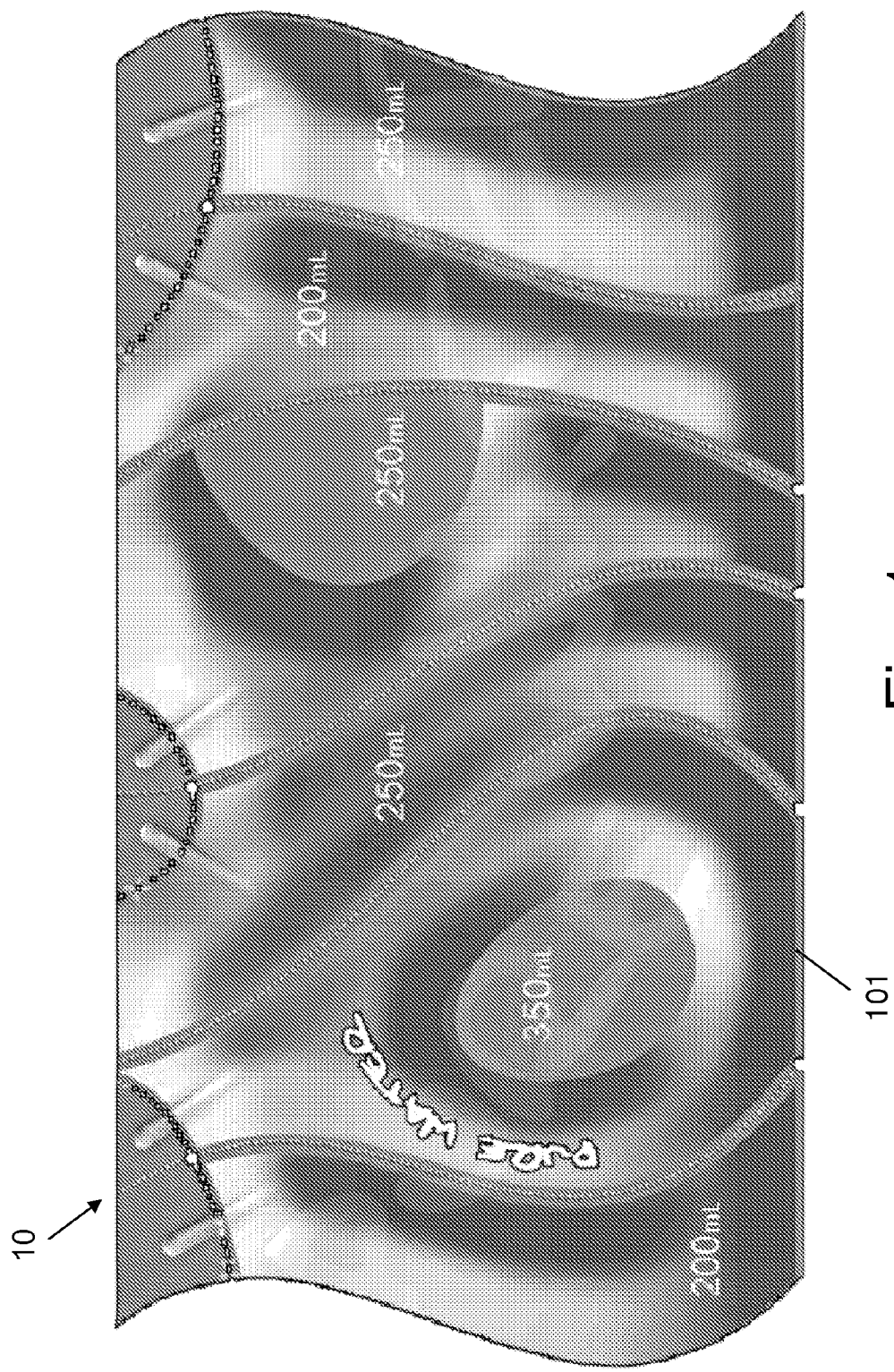
FIG. 1 illustrates the construction of an array of receptacle units of different volume, according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "biodegradable" as used herein is to be understood to include any polymers that degrade through the action of living organisms, light, air, water or any combinations thereof. Such biodegradable polymers include various synthetic polymers, such as polyesters, polyester amides, polycarbonates, etc. Naturally-derived semi-synthetic polyesters (e.g., from fermentation) may also be included in the term "biodegradable". Biodegradation reactions are typically enzyme-catalyzed and generally occur in the presence of moisture. Natural macromolecules containing hydrolyzable linkages, such as protein, cellulose and starch, are generally susceptible to biodegradation by the hydrolytic enzymes of microorganisms. A few man-made polymers, however, are also biodegradable. The hydrophilic/hydrophobic character of polymers greatly affects their biodegradability, with more polar polymers being more readily biodegradable as a general rule. Other important polymer characteristics that affect biodegradability include crystallinity, chain flexibility and chain length.

The term "sheet" as used herein is to be understood as having its customary meanings as used in the thermoplastic and packaging arts. The biodegradable compositions according to the invention can be used to manufacture a wide variety of articles of manufacture, including articles useful to package solid and liquid substances, including food substances. Thus, the sheets according to this invention include sheets having a wide variety of thicknesses (both measured and calculated).

The term "about" as used herein is to be understood to refer to a 10% deviation in the value related to.

The terms "particle" or "particulate filler" should be interpreted broadly to include filler particles having any of a variety of different shapes and aspect ratios. In general, "particles" are those solids having an aspect ratio (i.e., the ratio of length to thickness) of less than about 10:1. Solids having an aspect ratio greater than about 10:1 may be better understood as "fibers", as that term will be defined and discussed herein below.

The term "fibers" should be interpreted as a solid having an aspect ratio greater than at least about 10:1. Therefore, fibers are better able to impart strength and toughness than particulate fillers. As used herein, the terms "fibers" and "fibrous material" include both inorganic fibers and organic fibers.

Besides being able to biodegrade, it is often important for a polymer or polymer blend to exhibit certain physical properties. The intended application of a particular polymer blend will often dictate which properties are necessary in order for a particular polymer blend, or article manufactured there from, to exhibit the desired performance criteria. When relating to biodegradable sheets for use as packaging materials, particularly as liquid receptacles, desired performance criteria may include strain at break, Young's modulus and stress at maximum load.

In order to define the physical properties of the biodegradable sheets of this invention, several measurements were used. Stress at maximum load, Young's Modulus and the strain at break were measured using the ASTM D882-10 Standard Test Method for Tensile Properties of Thin Plastic Sheeting. The light transmittance and the haze were measured using the ASTM D1003-07e1 Standard Test Method for Haze and Luminous Transmittance of Transparent Plastics. The oxygen permeability of the biodegradable sheets was measured using the ASTM D3985-05(2010)e1 Standard Test Method for Oxygen Gas Transmission Rate Through Plastic Film and Sheeting Using a Coulometric Sensor. The water vapor permeability of the biodegradable sheets of the invention was measured using the ASTM E398-03(2009)e1 Standard Test Method for Water Vapor Transmission Rate of Sheet Materials Using Dynamic Relative Humidity Measurement.

In an embodiment of the invention, this invention provides a biodegradable sheet having a stress at maximum load of at least 15 Mpa. According to other embodiments, this invention provides a biodegradable sheet having a stress at maximum load of at least 30 Mpa. According to some embodiments of the invention, the stress at maximum load is in the range of 15-50 Mpa. According to some embodiments of the invention, the stress at maximum load is in the range of 15-20 Mpa. According to some embodiments of the invention, the stress at maximum load is in the range of 20-25 Mpa. According to some embodiments of the invention, the stress at maximum load is in the range of 25-30 Mpa. According to some embodiments of the invention, the stress at maximum load is in the range of 30-35 Mpa. According to some embodiments of the invention, the stress at maximum load is in the range of 35-40 Mpa. According to some embodiments of the invention, the stress at maximum load is in the range of 40-45 Mpa. According to some embodiments of the invention, the stress at maximum load is in the range of 45-50 Mpa. According to further embodiments of the invention, the stress at maximum load is in the range of 24-26 Mpa. According to further embodiments of the invention, the stress at maximum load is in the range of 46-48 Mpa. According to further embodiments of the invention, the stress at maximum load is in the range of 32-34 Mpa. According to some embodiments of the invention, the stress at maximum load is in the range of 19-21 Mpa. According to some embodiments of the invention, the stress at maximum load is in the range of 29-31 Mpa.

The biodegradable sheet of this invention has a strain at break of at least 280%. According to further embodiments, the strain at break is at least 300%. According to some embodiments, the strain at break is in the range of 400-600%. According to some embodiments, the strain at break is in the range of 280-850%. According to some embodiments, the strain at break is in the range of 280-350%. According to further embodiments, the strain at break is in the range of 350-450%. According to further embodiments, the strain at break is in the range of 450-550%. According to further embodiments, the strain at break is in the range of 550-650%. According to further embodiments, the strain at break is in the range of 650-750%. According to further embodiments, the strain at break is in the range of 750-850%. According to further embodiments, the strain at break is in the range of 410-420%. According to further embodiments, the strain at break is in the range of 725-735%. According to further embodiments, the strain at break is in the range of 575-585%. According to further embodiments, the strain at break is in the range of 555-565%. According to further embodiments, the strain at break is in the range of 615-625%.

The Young's Modulus of the biodegradable sheet of this invention is at least 200 Mpa. According to some embodiments of the invention, Young's Modulus is in the range of 200-800 Mpa. According to further embodiments of the invention, Young's Modulus is in the range of 400-600 Mpa. According to further embodiments, Young's Modulus is in the range of 300-350 Mpa. According to further embodiments, Young's Modulus is in the range of 350-400 Mpa. According to further embodiments, Young's Modulus is in the range of 400-450 Mpa. According to further embodiments, Young's Modulus is in the range of 450-500 Mpa. According to further embodiments, Young's Modulus is in the range of 500-550 Mpa. According to further embodiments, Young's Modulus is in the range of 550-600 Mpa. According to further embodiments, Young's Modulus is in the range of 600-650 Mpa. According to further embodiments, Young's Modulus is in the range of 650-700 Mpa. According to further embodiments, Young's Modulus is in the range of 700-750 Mpa. According to further embodiments, Young's Modulus is in the range of 750-800 Mpa. According to further embodiments, Young's Modulus is in the range of 675-685 Mpa. According to further embodiments, Young's Modulus is in the range of 565-575 Mpa. According to further embodiments, Young's Modulus is in the range of 600-610 Mpa. According to further embodiments, Young's Modulus is in the range of 670-680 Mpa. According to further embodiments, Young's Modulus is in the range of 385-395 Mpa.

According to some embodiments of the invention, the light transmittance of the biodegradable sheet of the invention is at least 75%. According to further embodiments, the light transmittance is in the range of 75-95%. According to further embodiments, the light transmittance is in the range of 75-80%. According to further embodiments, the light transmittance is in the range of 80-85%. According to further embodiments, the light transmittance is in the range of 85-90%. According to further embodiments, the light transmittance is in the range of 90-95%. According to further embodiments, the light transmittance is above 95%.

According to some embodiments of the invention, the oxygen transmission rate of the biodegradable sheet of the invention is lower than 8500 cc/m2/24 hours. According to further embodiments, the oxygen transmission rate is in the range of 100-130 cc/m2/24 hours. According to further embodiments, the oxygen transmission rate is in the range of 100-1000 cc/m2/24 hours. According to further embodiments, the oxygen transmission rate is in the range of 1000-2000 cc/m2/24 hours. According to further embodiments, the oxygen transmission rate is in the range of 2000-3000 cc/m2/24 hours. According to further embodiments, the oxygen transmission rate is in the range of 3000-4000 cc/m2/24 hours. According to further embodiments, the oxygen transmission rate is in the range of 4000-5000 cc/m2/24 hours. According to further embodiments, the oxygen transmission rate is in the range of 5000-6000 cc/m2/24 hours. According to further embodiments, the oxygen transmission rate is in the range of 6000-7000 cc/m2/24 hours. According to further embodiments, the oxygen transmission rate is in the range of 7000-8000 cc/m2/24 hours.

According to some embodiments of the invention, the water vapor transmission rate of the biodegradable sheet of the invention is lower than 30 gr/m2/day. According to further embodiments of the invention, the water vapor transmission rate is lower than 20 gr/m2/day. According to further embodiments, the water vapor transmission rate is in the range of 15-20 gr/m2/day. According to further embodiments, the water vapor transmission rate is in the range of 20-25 gr/m2/day. According to further embodiments, the water vapor transmission rate is in the range of 25-30 gr/m2/day.

The invention is further directed to a biodegradable sheet comprising any appropriate amounts of any appropriate biodegradable polymers, capable of providing the biodegradable sheet with the desired physical properties, as detailed above. According to some embodiments, the biodegradable sheet of the invention is recyclable, i.e., the material from which it is prepared may be reused (after appropriate treatment, i.e., cleaning when necessary, grinding, heating, etc.) to prepare additional articles of manufacture.

According to further embodiments, the biodegradable sheet of the invention is compostable.

According to some embodiments, the biodegradable sheet comprises synthetic polyesters, semi-synthetic polyesters made by fermentation (e.g., PHB and PHBV), polyester amides, polycarbonates, and polyester urethanes. In other embodiments the biodegradable sheet of the invention includes at least one of a variety of natural polymers and their derivatives, such as polymers comprising or derived from starch, cellulose, other polysaccharides and proteins.

According to some embodiments, the biodegradable sheet comprises polylactic acids (PLA) or derivatives thereof related to as CPLA, polybutylene succinate (PBS), polybutylene succinate adipate (PBSA), polyethylene succinate (PES), poly(tetramethylene-adipate-co-terephthalate (PTAT), polyhydrozyalkanoates (PHA), poly(butylene adipate-co-terephthalate (PBAT), thermoplastic starch (TPS), polyhydroxyburates (PHB), polyhydroxyvalerates (PHV), polyhydroxybutyrate-hydroxyvalerate copolymers (PHBV), polycaprolactone (PCL), Ecoflex®, an aliphatic-aromatic copolymer, Eastar Bio®, another aliphatic-aromatic copolymer, Bak® comprising polesteramides, Biomax®, which is a modified polyethylene terephathalate, Novamont®, or any combination thereof.

According to some embodiments, the biodegradable sheet comprises polylactic acids (PLA) or derivatives thereof related to as CPLA and/or polybutylene succinate (PBS) together with any one of polybutylene succinate adipate (PBSA), polyethylene succinate (PES), poly(tetramethylene-adipate-coterephthalate (PTAT), polyhydrozyalkanoates (PHA), poly(butylene adipate-co-terephthalate (PBAT), thermoplastic starch (TPS), polyhydroxyburates (PHB), polyhydroxyvalerates (PHV), polyhydroxybutyrate-hydroxyvalerate copolymers (PHBV), polycaprolactone (PCL), Ecoflex®, an aliphatic-aromatic copolymer, Eastar Bio®, another aliphatic-aromatic copolymer, Bak® comprising polesteramides, Biomax®, which is a modified polyethylene terephathalate, Novamont®, or any combination thereof.

According to some embodiments, the PLA is a homopolymer. According to further embodiments, the PLA is copolymerized with glycolides, lactones or other monomers. One particularly attractive feature of PLA-based polymers is that they are derived from renewable agricultural products. Further, since lactic acid has an asymmetric carbon atom, it exists in several isomeric forms. The PLA used according to some embodiments of the invention includes poly-L-lactide, poly-D-lactide, poly-DL-lactide or any combination thereof.

According to some embodiments, the biodegradable sheet of the invention further comprises any appropriate additives. According to one embodiment, the additive softens the biodegradable polymer. The softeners used may be selected from the group comprising Paraloid®, Sukano®, tributyl acetyl citrate (A4®) or any combination thereof.

According to some embodiments, the biodegradable sheet of the invention comprises at least one nanoclay and/or at least one nano-composite. The addition of the nanoclay and/or the nano-composite lowers the water vapor transmission rate and the oxygen transmission rate of the biodegradable sheet of the invention, thus acting as barriers in the sheet. Further, according to certain embodiments of this invention, the nanoclays and the nano-composites added to the biodegradable sheet are naturally occurring materials, and therefore, the sheets remain biodegradable. According to one embodiment, montmorillonite, vermiculite or any combination thereof are added to the composition of the biodegradable sheet.

According to one embodiment, nanoclays based on montmorilonite with polar organophilic based surface treatment and/or nanoclays based on vermiculite, heat treated and polar organophilic base surface treated are added to the biodegradable composition in order to create a well dispersed material. According to one embodiment, the nanoclay based gas barrier is dispersed in the bulk of the biodegradable composition, preferably added during the melt compounding process. The dispersment of nanoclay platelets creates a tortuous path in the bulk of the composition, thus leading to a reduction in gas permeation rates though the biodegradable sheet produced. According to another embodiment, the nanoclay based gas barrier is implemented as an internal gas barrier layer in a multilayer biodegradable sheet, wherein the barrier layer reduces the gas permeation rate.

According to some embodiments, the nanoclay particles are surface treated so as to enable them to be homogenously dispersed in the biodegradable polymer matrix. According to some embodiments, the nanoclay particles are treated with a bifunctional moiety, wherein one functional group of the moiety is conjugated to the nanoclay particle, while the other functional group is conjugated to the biodegradable polymer. Thus, the bi-functional moiety acts as a bridge between the nanoclay particles and the biodegradable polymer. According to some embodiments, more than one bifunctional moiety is used such that the bridge between the nanoclay and the biodegradable polymer may be two or more bifunctional groups conjugated to one another. The tying of the functional group to the nanoclay or the biodegradable polymer may be by any process, including adsorption, covalent bonding, ionic bonding, etc.

According to some embodiments, before tying the bifunctional moiety to the nanoclay, the nanoclay is pre-treated to remove ions adsorbed on the surface thereof. According to one embodiment, the nanoclay is pre-treated with an acid. According to one embodiment, the nanoclay is pretreated with HCl.

According to some embodiments, the bi-functional moiety is 3-(dimethylamino)-1-propylamine (DMPA), which has a tertiary amine functional group and a primary amine functional group. According to some embodiments, nanoclay particles, possibly pre-treated nanoclay particles, are reacted with the tertiary amine of the DMPA, leaving the primary amine free for reaction. The primary amine may be further reacted with any appropriate bifunctional group, such as a bifunctional isocyanate, wherein one of the isocyanate groups is conjugated to the primary amine and the other is left free. According to some embodiments, the bifunctional isocyanate is hexamethylene diisocyanate (HDI), methylene diphenyl diisocyanate (MDI) or toluene diisocyanate (TDI). Once the first isocyanate group is conjugated to the primary amine of the DMPA, the second isocyanate group may be conjugated to any appropriate biodegradable polymer. Thus, according to the above procedure, the nanoclay is conjugated to the DMPA, which in turn is conjugated to the bifunctional isocyanate, which in turn is conjugated to the biodegradable polymer, thus allowing the homogenous dispersion of the nanoclay particles in the biodegradable polymer matrix. According to further embodiments, the primary amine is reacted with a maleic anhydride, which is further reacted with the biodegradable polymer, such that the bridge between the nanoclay and the biodegradable polymer is formed from a bifunctional moiety, such as DMPA, conjugated to an additional bi functional moiety, such as MAH.

According to further embodiments, the nanoclay particles are covalently bound to a moiety having two or more functional groups, such as triethoxysilane substituted with an isocyanate group, such that covalent bonds are formed by a reaction between the ethoxy-silane groups on the functional moiety and the siloxy groups on the nanoclay surface. The remaining isocyanate group in turn may be reacted with any appropriate biodegradable polymer, thus forming a bridge between the nanoclay particles and the biodegradable polymer, ensuring the homogeneous dispersion of the nanoclay particles throughout the biodegradable matrix.

According to further embodiments, the nanoclay particles are covalently bound to a moiety having two or more functional groups, such as aminopropyl triethoxysilane (APTES), to form covalent bonds by a condensation reaction of the ethoxy-silane groups with the siloxy groups on the nanoclay surface. The remaining functional group, e.g., a primary amine on the APTES molecule, may be further reacted with any appropriate bifunctional group, such as bifunctional isocyanate. Since the bifunctional isocyanate have two functional groups, once reacted with the remaining functional group of the functional moiety conjugated to the nanoclay, a free functional group remains, which may be reacted with any appropriate biodegradable polymer, thus forming a bridge between the nanoclay particles and the biodegradable polymer, ensuring the homogeneous dispersion of the nanoclay particles throughout the biodegradable matrix.

According to some embodiments, the functional moiety reacts with the siloxy groups on the nanoclay surface and acts as a bridge, or anchoring moiety, between the inorganic nanoclay particles and the organic biodegradable polymer. The nanoclay particles are processed with monomer/polymer in about a 1:2, 1:3, 1:4, 1:5, 1:6 ratio, making a final nanoclay in concentrate in dispersion of 25% w/w.

According to further embodiments, functional groups on the nanoclay surface, such as siloxyl groups, may be used as initiators for a ring opening polymerization process (ROP). Thus, the nanoclay particles are reacted with ring-bearing monomers, such as L-lactide, D-lactide, D,L-lactide and epsilon-caprolacton or a combination thereof. Each ring opened has a free radical that reacts with an additional monomer in a ring opening process, thus forming polymers, in the shape of polymer brushes, on the surface of the nanoclay particles. Once the nanoclay particles are conjugated to such polymer brushes, they may be easily compounded with any appropriate biodegradable polymer such that the nanoclay particles are homogeneously dispersed throughout the biodegradable polymer matrix. Further, such polymer brushes are also considered to be biodegradable, thus, offering an exfoliation process for nanoclay particles that does not involve any compounds that are not biodegradable, ensuring that the polymeric films comprising the same are fully biodegradable.

According to some embodiments, the ROP may be performed between at any temperature between 150° C. to 180° C., possibly in the presence of a catalyst, such as an organo-metal catalyst, like but are not limited to tin tetrachloride ($SnCl_4$), stannous octoate (SnOct) and dibutyltin dilaurate (DBTL). According to further embodiments, the ROP is initiated by heating and/or the addition of a catalyst after the nanoclay particles are fully dispersed in the monomer solution.

According to some embodiments, the preparation of polymers on the nanoclay surface by any appropriate means, such as ROP, results in the formation of polymer brushes perpendicular to the nanoclay particle surface, which contributes to the stable exfoliation of the nanoclay particles, as well as to the homogenous particles dispersion of the nanoclays throughout the biodegradable polymer. According to some embodiments, the polymer brushes are composed of random copolymers of lactide and caprolactone, the lactide is with about 10% mol of the caprolactone, and the total polymers are about 75% w/w of the nanoclay concentrate. Such polymers have a transition temperature slightly below 60° C. and therefore, the polymer brushes coating the nanoclay particles may be fully molten when the polymer is melted and prepared for extrusion, allowing homogenous dispersion of the nanoclay, as well as enhanced particle orientation. Such nanoclay particles having polymer brushes on their surface are also related to herein as a nanoclay concentrate. According to some embodiments, the nanoclay concentrate is prepared by any appropriate means, not necessarily ROP.

Thus, according to some embodiments, the prepared polymeric film includes at least one layer of a surface modified nanoclay, homogenously dispersed in a biodegradable polymer matrix.

According to one embodiment, the nanoclay added to the biodegradable sheet creates a tortuous structure that resists the penetration of moisture, oil, grease and gases, such as oxygen, nitrogen and carbon dioxide. According to one embodiment of the invention, the nanoclay is based on nano-kaolin. According to another embodiment, the nanoclay added to the biodegradable sheet is based on bentonite, which is an absorbent aluminium phyllosilicate. According to one embodiment, the nanoclay is based on Cloisite®. According to one embodiment, a mixture of any appropriate nanoclays may be added to the biodegradable sheet.

According to one embodiment, the nanoclay is dispersed in the bulk of the biodegradable composition, resulting in the dispersment of the nanoclay in at least one layer of the biodegradable sheet. According to some embodiments, the nanoclay is added during the melt compounding process. According to another embodiment, the nanoclay is added to the biodegradable sheet in a separate layer, together with a biodegradable polymer, thus forming a nano-composite layer. According to one embodiment, the nanoclay layer in the multilayer biodegradable sheet is an internal layer, i.e., is not exposed to the outside atmosphere.

According to one embodiment of the invention, the amount of the nanoclay is about 20-30% w/w of the nano-composite layer. According to one embodiment, the amount of the nanoclay is about 15-20% w/w of the nano-composite layer. According to one embodiment, the amount of the nanoclay is about 10-15% w/w of the nano-composite layer. According to one embodiment, the amount of the nanoclay is about 5-10% w/w of the nano-composite layer. According to one embodiment, the amount of the nanoclay is about 1-5% w/w of the nano-composite layer. According to one embodiment, the amount of the nanoclay is less than about 20% w/w of the nano-composite layer. According to one embodiment, the amount of the nanoclay is less than about 15% w/w of the nano-composite layer.

According to one embodiment of the invention, one of the layers may include oxygen and moisture scavengers, which may actively attract and remove the permeated gases from the polymeric matrix and expel it. Commercial "oxygen scavengers" may be incorporated into polyethylene terephthalate (PET) or polyamides. The additives may be used at levels of about 2-8%. According to some embodiments, the additives are miscible according to some embodiments an oxidizable polymer may be used for the reaction, which may be catalyzed according to some embodiments by a transition metal. According to some embodiments the catalyst is a cobalt complex with organic molecules such as ethylenediaminetetraacetic acid (EDTA). The reaction may be triggered by humidity moving through the plastic matrix. According to some embodiments the scavengers not only remove oxygen as it ingresses into the package, but also as it egresses from the package headspace into the wall of the package. Since the dissolved oxygen in beverages tends to migrate into the package due to gradient affect, it may be likewise removed. According to some embodiments, when utilizing oxygen scavengers, the oxygen levels are close to zero for long shelf life.

According to some embodiments, the combination of oxygen scavengers and nanoclays creates a synergistic effect.

According to one embodiment, the biodegradable sheet of the invention includes at least one external layer that is a multilayer laminate, based on biodegradable blends. According to further embodiments, the biodegradable sheet of the invention includes at least one internal biodegradable nanocomposite layer. According to some embodiments, the biodegradable sheet includes at least one internal core layer of a gas barrier material, such as polyvinyl alcohol (PVOH). According to some embodiments, the biodegradable sheet includes one, two or more internal core layers of a gas barrier material, such as PVOH. A highly polar gas barrier material, such as PVOH, exhibits weak interaction with low polarity gases, such as oxygen and carbon dioxide, which, together with the crystalline regions in the sheet, reduce the permeability rate of gases through the sheet. The PVOH can be further modified with maleic anhydride (MAH) to better compatibilize it with the other polymer layers. According to further embodiments, the PVOH may be modified with any appropriate compatibilizer or cross linker, in order to better compatibilize it with the other polymer layers. According to some embodiments, the PVOH is grafted with a biodegradable polymer. Variety of crosslinking agents may be used, these include acrylic or methacrylic functionalized monomer, having one or more functional group, and usually the crosslinker contains two reactive groups to be used for crosslinking More specifically crosslinkers may include but are not limited to 1,4-Butanediol dimethacrylate, hexamethylene dimethacrylate, maleic anhydride, polyethylene glycol-dimethacrylate, and polycaprolactone dimethacrylate.

According to one embodiment of the invention, the biodegradable sheet includes natural hygroscopic materials including polysaccharides, such as for example, starch to be used as high polar gas barrier material, to actively absorb moisture. The starch can be incorporated into the polymer matrix as a blend, tend to phase separate, to form islands of absorbing material, which, together with the crystalline regions in the sheet, reduce the permeability rate of gases through the sheet.

According to some embodiments of the invention, the biodegradable sheet includes PVOH and a nanoclay dispersed in one or more of the layers as described above.

According to some embodiments, the biodegradable sheet comprises an external laminate layer, an internal nanocomposite layer and an internal core layer. Such a biodegradable sheet provides low permeability rate of gases.

According to one embodiment, a compatibilizer is added to the biodegradable sheet. The compatibilizer is added in order to enhance the adhesion between the different layers of the multilayer biodegradable sheet. According to one embodiment, the compatibilizer is based on PBSA grafted with maleic anhydride, which is a monomer known for grafting used mainly for modifying polyolefins. According to one embodiment, the PBSA is grafted with the maleic anhydride in a twin-screw extruder, using a continuous flow of nitrogen. According to one embodiment the drafting is initiated by an initiator, such as dicumyl peroxide, benzoyl peroxide and 2,2-azobis(isobutyronitrile). According to one embodiment, a mixture of PBSA, about 3% maleic anhydride and about 1% dicumyl peroxide is extruded in order to obtain PBSA grafted with maleic anhydride. According to one embodiment, a mixture of PBSA, maleic anhydride and 2,2-azobis(isobutyronitrile) is extruded in order to obtain PBSA grafted with maleic anhydride. In some embodiments other crosslinkers may be used.

According to one embodiment, a mixture of PVOH, maleic anhydride and 2,2-azobis(isobutyronitrile) is extruded in order to obtain PVOH grafted with maleic anhydride (MAH). According to one embodiment, a mixture of PVOH with highly branched PBS and maleic anhydride and 2,2-azobis(isobutyronitrile) (AIBN) is extruded in order to obtain PVOH grafted with maleic anhydride, compounded with PBS. According to some embodiments of the invention the weight percentage of the PVOH is in the range of 10-60% w/w over the PBS, that is in the range of 40-90% w/w. A variety of other radical initiators may be used, these include peroxides and azo- group free radical formers. More specifically, radial formers may include but are not limited to benzoyl peroxide (BPO), lauroyl peroxide (LP), azobisisobutyronitrile (AIBN), and Azobis(cyanocyclohexane), (ACHN).

According to some embodiments, the amount of maleic anhydride grafted to the PVOH is about 0.1-5.0% w/w. According to further embodiments, the amount of the 2,2-azobis(isobutyronitrile) used as an initiator is about 0.1-0.3% w/w. According to some embodiments, when the amount of the maleic anhydride is about 1.0% w/w, the amount of the 2,2-azobis(isobutyronitrile) is about 0.3% w/w and when the amount of the maleic anhydride is about 0.5% w/w, the amount of the 2,2-azobis(isobutyronitrile) is about 0.1% w/w. According to some embodiments, the ratio between the MAH and the 2,2-azobis(isobutyronitrile) is about 1:2-1:10. According to further embodiments, the amount of the 2,2-azobis(isobutyronitrile) is about 0.5-1.0% w/w. According to further embodiments, the amount of the 2,2-azobis(isobutyronitrile) is about 1.0-2.0% w/w. According to further embodiments, the amount of the 2,2-azobis(isobutyronitrile) is about 2.0-3.0% w/w. According to further embodiments, the amount of the 2,2-azobis(isobutyronitrile) is about 3.0-4.0% w/w. According to further embodiments, the amount of the 2,2-azobis(isobutyronitrile) is about 4.0-5.0% w/w.

According to one embodiment, a mixture of highly branched PVOH with highly branched PBS, PBSA, PLA or PCL and about 1% maleic anhydride and about 0.3% 2,2-azobis(isobutyronitrile) is extruded in order to obtain PVOH grafted with maleic anhydride, compounded with PBS. According to one embodiment, a mixture of PVOH with highly branched molecule of PBS or any other appropriate polymer and about 0.5% maleic anhydride and about 0.1% 2,2-azobis(isobutyronitrile) is extruded in order to obtain PVOH grafted with maleic anhydride compounded with PBS.

According to one embodiment, the amount of compatibilizer added to the PBSA layer is up to 10% w/w. According to one embodiment, the amount of compatibilizer added to the PBSA layer is up to 5% w/w. According to another embodiment, the amount of compatibilier added to the PBSA layer is up to 4%. According to another embodiment, the amount of compatibilier added to the PBSA layer is up to 3%. According to another embodiment, the amount of compatibilier added to the PBSA layer is up to 2%. According to another embodiment, the amount of compatibilier added to the PBSA layer is up to 1%. According to another embodiment, the amount of compatibilier added to the PBSA layer is in the range of 2-4%.

According to one embodiment, the amount of compatibilizer in the PVOH layer is up to about 10% w/w. According to one embodiment, the amount of compatibilizer in the PVOH layer is up to about 5% w/w. According to another embodiment, the amount of compatibilier in the PVOH layer is up to about 4% w/w. According to another embodiment, the amount of compatibilier in the PVOH layer is up to about 3% w/w. According to another embodiment, the amount of compatibilier in the PVOH layer is up to about 2% w/w. According to another embodiment, the amount of compatibilier in the PVOH layer is up to about 1% w/w. According to another embodiment, the amount of compatibilier in the PVOH layer is in the range of about 2-4% w/w.

According to some embodiments, the biodegradable sheet of the invention further comprises inorganic particulate fillers, fibers, organic fillers or any combination thereof, in order to decrease self-adhesion, lower the cost, and increase the modulus of elasticity (Young's modulus) of the polymer blends.

Examples of inorganic particulate fillers include, gravel, crushed rock, bauxite, granite, limestone, sandstone, glass beads, aerogels, xerogels, mica, clay, alumina, silica, kaolin, microspheres, hollow glass spheres, porous ceramic spheres, gypsum dihydrate, insoluble salts, calcium carbonate, magnesium carbonate, calcium hydroxide, calcium aluminate, magnesium carbonate, titanium dioxide, talc, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and other geologic materials. A wide variety of other inorganic fillers may be added to the polymer blends, including materials such as metals and metal alloys (e.g., stainless steel, iron, and copper), balls or hollow spherical materials (such as glass, polymers, and metals), filings, pellets, flakes and powders (such as microsilica) as well as any combination thereof.

Examples of organic fillers include seagel, cork, seeds, gelatins, wood flour, saw dust, milled polymeric materials, agar-based materials, native starch granules, pregelatinized and dried starch, expandable particles, as well as combination thereof. Organic fillers may also include one or more appropriate synthetic polymers.

Fibers may be added to the moldable mixture to increase the flexibility, ductility, bendability, cohesion, elongation ability, deflection ability, toughness, and fracture energy, as well as the flexural and tensile strengths of the resulting sheets and articles. Fibers that may be incorporated into the polymer blends include naturally occurring organic fibers, such as cellulosic fibers extracted from wood, plant leaves, and plant stems. In addition, inorganic fibers made from glass, graphite, silica, ceramic, rock wool, or metal materials may also be used. Preferred fibers include cotton, wood fibers (both hardwood or softwood fibers, examples of which include southern hardwood and southern pine), flax, abaca, sisal, ramie, hemp, and bagasse because they readily decompose under normal conditions. Even recycled paper fibers can be used in many cases and are extremely inexpensive and plentiful. The fibers may include one or more filaments, fabrics, mesh or mats, and which may be co-extruded, or otherwise blended with or impregnated into, the polymer blends of the present invention.

According to further embodiments, plasticizers may be added to impart desired softening and elongation properties as well as to improve processing, such as extrusion. Optional plasticizers that may be used in accordance with the present invention include, but are not limited to, soybean oil caster oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bis-oleamide, polymeric plasticizers such as poly(1,6-hexamethylene adipate), and other compatible low molecular weight polymers.

According to some embodiments, lubricants, such as salts of fatty acids, e.g., magnesium stearate, may also be incorporated into the biodegradable sheets of the invention.

According to additional embodiments, the biodegradable sheets of this invention may be embossed, crimped, quilted or otherwise textured to improve their physical properties.

The biodegradable sheet of this invention is composed of any appropriate number of layers. According to one embodiment, the biodegradable sheet of this invention comprises one layer. According to another embodiment, the biodegradable sheet of this invention comprises two layers. According to another embodiment, the biodegradable sheet of this invention comprises three layers. According to another embodiment, the biodegradable sheet of this invention comprises four layers. According to another embodiment, the biodegradable sheet of this invention comprises five layers.

According to some embodiments, the biodegradable sheets of this invention have any desired thickness. According to some embodiments, the thickness of the sheets ranges from 20-300 microns. The measured thickness will typically be between 10-100% larger than the calculated thickness when the sheets are prepared from compositions that have a relatively high concentration of particulate filler particles, which can protrude from the surface of the sheet. This phenomenon is especially pronounced when significant quantities of filler particles, having a particle size diameter that is larger than the thickness of the polymer matrix, are used.

According to some embodiments, the thickness of a one layer sheet is about 40-60 microns. According to some embodiments, the thickness of a one layer sheet is about 50 microns. According to some embodiments, the thickness of a three layer sheet is about 90-110 microns. According to some embodiments, the thickness of a three layer sheet is about 100 microns. According to some embodiments, the biodegradable sheets of the invention have a low haze.

The biodegradable sheet of this invention may be prepared using any appropriate means. According to certain embodiments, the biodegradable polymers used according to this invention are extruded (using mono or co-extrusion methods), blown, cast or otherwise formed into sheets for use in a wide variety of packaging materials, or they may be molded into shaped articles. According to some embodiments, known mixing, extrusion, blowing, injection molding, and blow molding apparatus known in the thermoplastic art are suitable for use in forming the biodegradable sheets of this invention. In an embodiment of the invention, the sheet may be blown into various shapes including a shape of a bottle. According to one embodiment of the invention, the biodegradable sheet is prepared by compounding the raw biopolymers and possible additives and then preparing a sheet in a cast extruder. Once the biodegradable sheet is prepared, it is post-treated by heat sealing, according to some embodiments, to join two parts of the same sheet or two separate sheets, in order to prepare pockets, pouches etc. According to further embodiments, the biodegradable sheets of this invention are coated with any appropriate coating, while ensuring that the end product remains biodegradable.

According to further embodiments, the one layered biodegradable sheet of the invention comprises about 20% w/w PLA and about 80% w/w PBS. According to further embodiments, the biodegradable sheet of the invention comprises about 20% w/w PLA, about 40% w/w PBS and about 40% w/w novamont CF. According to further embodiments, the biodegradable sheet of the invention comprises about 33% w/w PLA, about 33% w/w PBS and about 33% w/w ecoflex.

According to further embodiments, the one layered biodegradable sheet of the invention consists of about 20% w/w PLA and about 80% w/w PBS. According to further embodiments, the biodegradable sheet of the invention consists of about 20% w/w PLA, about 40% w/w PBS and about 40% w/w novamont CF. According to further embodiments, the biodegradable sheet of the invention consists of about 33% w/w PLA, about 33% w/w PBS and about 33% w/w ecoflex.

According to further embodiments, the multi-layered biodegradable sheet of the invention comprises the following three layers, wherein layer 2 is sandwiched between layers 1 and 3 so that layers 1 and 3 are on the outside of the sheet, in direct contact with the outside atmosphere, while layer 2 is positioned between them e:
Layer 1: comprising about 33.3% w/w PLA, 33.3% w/w PBS and 33.3% w/w Ecoflex;
Layer 2: comprising about 100% w/w PHA; and
Layer 3: comprising about 33.3% w/w PLA, 33.3% w/w PBS and 33.3% w/w Ecoflex.

According to further embodiments, the multi-layered biodegradable sheet of the invention comprises the following three layers:
Layer 1: comprising about 33.3% w/w PLA, 33.3% w/w PBSA and 33.3% w/w PBAT;
Layer 2: comprising about 100% w/w PBAT; and
Layer 3: comprising about 33.3% w/w PLA, 33.3% w/w PBSA and 33.3% w/w PBAT.

According to further embodiments, the multi-layered biodegradable sheet of the invention consists the following three layers:
Layer 1: consisting about 33.3% w/w PLA, 33.3% w/w PBS and 33.3% w/w Ecoflex;
Layer 2: consisting about 100% w/w PHA; and
Layer 3: consisting about 33.3% w/w PLA, 33.3% w/w PBS and 33.3% w/w Ecoflex.

According to further embodiments, the multi-layered biodegradable sheet of the invention consists the following three layers:
Layer 1: consisting about 33.3% w/w PLA, 33.3% w/w PBSA and 33.3% w/w PBAT;
Layer 2: consisting about 100% w/w PBAT; and
Layer 3: consisting about 33.3% w/w PLA, 33.3% w/w PBSA and 33.3% w/w PBAT.

According to further embodiments, the monolayer biodegradable sheet consists of about 75% PBSA and about 25% PLA. According to some embodiments, the multi-layered biodegradable sheet of the invention consists of the following three, five or more layers. According to some embodiments the external layers consist of about 25% w/w PLA and about 75% w/w PBSA. According to some embodiments, PVOH layer is included as a core layer, sandwiched between the biodegradable polymer layers and any existing nanocomposite layers. According to some embodiments, at least one layer consisting of 100% biodegradable polymers, e.g., PBSA is included. According to some embodiments, the biodegradable sheet includes at least one internal layer consisting of PBSA and about 10-15% w/w nanoclays. According to some embodiments, the biodegradable sheet includes at least one internal layer consisting of PBSA and about 5-10% w/w nanoclays. According to some embodiments, the biodegradable sheet includes at least one internal layer consisting of PBSA and about 0-5% w/w nanoclays. According to some embodiments, the biodegradable sheet includes at least one internal layer consisting of PBSA and about 15-20% w/w nanoclays. According to some embodiments, the biodegradable sheet includes at least one internal layer consisting of PBSA and about 20-25% w/w nanoclays. According to further embodiments, the PBSA may be replaced with any appropriate biodegradable polymer blend.

According to further embodiments, the multi-layered biodegradable sheet of the invention consists the following three layers:
Layer 1: consisting about 25% w/w PLA and about 75% w/w PBSA;
Layer 2: consisting about 100% w/w PBSA; and
Layer 3: consisting about 25% w/w PLA and about 75% w/w PBSA.

According to further embodiments, the multi-layered biodegradable sheet of the invention consists the following three layers:
Layer 1: consisting about 75% w/w PLA and about 25% w/w PBSA;
Layer 2: consisting about 100% w/w PBSA; and
Layer 3: consisting about 75% w/w PLA and about 25% w/w PBSA.

According to one embodiment, the thickness of all three layers is the same.

According to further embodiments, the multi-layered biodegradable sheet of the invention consists the following five layers:
Layer 1: consisting about 25% w/w PLA and about 75% w/w PBSA;
Layer 2: consisting about 100% w/w PBSA;
Layer 3: consisting about 40% w/w PVOH grafted with 60% PBSA;
Layer 4: consisting about 100% w/w PBSA; and
Layer 5: consisting about 25% w/w PLA and about 75% w/w PBSA.

According to one embodiment, the thickness of layers 1 and 5 is about 30% of the total thickness of the sheet, and the thickness of layers 2 and 4 is about 15% of the total thickness of the sheet and the thickness of layer 3 is about 10% of the total sheet.

According to further embodiments, the multi-layered biodegradable sheet of the invention consists the following five layers:
Layer 1: consisting about 25% w/w PLA and about 75% w/w PBSA;
Layer 2: consisting of about 98-85% PBSA and about 2-15% w/w nanoclays;
Layer 3: consisting of about 40% w/w PVOH grafted with 60% PBSA;
Layer 4: consisting of about 98-85% PBSA and about 2-15% w/w nanoclays;
Layer 5: consisting of about 25% w/w PLA and about 75% w/w PBSA.

According to further embodiments, the multi-layered biodegradable sheet of the invention consists the following five layers:
Layer 1: consisting about 25% w/w PLA and about 75% w/w PBSA;
Layer 2: consisting of about 40% w/w PVOH, or EVOH grafted with 60% PBSA;
Layer 3: consisting of about 98-85% PBSA and about 2-15% w/w nanoclays;
Layer 4: consisting of about 40% w/w PVOH or EVOH grafted with 60% PBSA;
Layer 5: consisting of about 25% w/w PLA and about 75% w/w PBSA.

According to further embodiments, the multi-layered biodegradable sheet of the invention consists the following five layers:

Layer 1: consisting about 25% w/w PLA and about 75% w/w PBSA;
Layer 2: consisting of about 39.75% w/w PVOH or EVOH wherein each of the PVOH or EVOH is grafted with 0.5% Maleic anhydride (MAH) and 59.75% PBS or PBSA;
Layer 3: consisting of about 98-85% PBSA and about 2-15% w/w nanoclays;
Layer 4: consisting of about 39.75% w/w PVOH or EVOH wherein each of the PVOH or EVOH is grafted with 0.5% Maleic anhydride (MAH) and 59.75% PBS;
Layer 5: consisting of about 25% w/w PLA and about 75% w/w PBSA.

According to further embodiments, the multi-layered biodegradable sheet of the invention consists the following five layers:
Layer 1: consisting about 25% w/w PLA and about 75% w/w PBSA;
Layer 2: consisting of about 39.75% w/w PVOH or EVOH wherein each of the PVOH or EVOH is grafted with 0.5% Maleic anhydride (MAH) and 59.75% PBS or PBSA;
Layer 3: consisting of about 98-85% PBSA and about 2-15% w/w nanoclays;
Layer 4: consisting of about 39.75% w/w PVOH or EVOH wherein each of the PVOH or EVOH is grafted with 0.5% Maleic anhydride (MAH) and 59.75% PBS or PBSA;
Layer 5: consisting of about 25% w/w PLA and about 75% w/w PBSA.

According to further embodiments, the multi-layered biodegradable sheet of the invention consists the following five layers:
Layer 1: consisting about 25% w/w PLA, about 55% w/w PBSA and about 20% PBS;
Layer 2: consisting of about 99.5% w/w PVOH or EVOH wherein each of the PVOH or EVOH is grafted with Maleic anhydride (MAH);
Layer 3: consisting of about 98-85% PBSA and about 2-15% w/w nanoclays;
Layer 4: consisting of about 99.5% w/w PVOH or EVOH wherein each of the PVOH or EVOH is grafted with Maleic anhydride (MAH);
Layer 5: consisting about 25% w/w PLA, about 55% w/w PBSA and about 20% PBS;

According to further embodiments, the multi-layered biodegradable sheet of the invention consists the following five layers:
Layer 1: consisting about 25% w/w PLA, about 55% w/w PBSA and about 20% PBS;
Layer 2: consisting of about 99.5% w/w PVOH or EVOH wherein each of the PVOH or EVOH is grafted with Maleic anhydride (MAH);
Layer 3: consisting of about 98-85% PBSA and about 2-15% w/w nanoclays;
Layer 4: consisting of about 99.5% w/w PVOH or EVOH wherein each of the PVOH or EVOH is grafted with Maleic anhydride (MAH);
Layer 5: consisting about 25% w/w PLA, about 55% w/w PBSA and about 20% PBS;

According to further embodiments, the multi-layered biodegradable sheet of the invention consists the following five layers:
Layer 1: consisting about 25% w/w PLA, and about 75% w/w PBSA;
Layer 2: consisting of about 5-45% w/w PBSA, about 50-75% w/w PLA and about 5-20% w/w Starch;
Layer 3: consisting of about 98-85% PBSA or PBS and about 2-15% w/w nanoclays;
Layer 4: consisting of about 5-45% w/w PBSA, about 50-75% w/w PLA and about 5-20% w/w Starch;
Layer 5: consisting about 25% w/w PLA, and about 75% w/w PBSA;

According to further embodiments, the multi-layered biodegradable sheet of the invention consists the following five layers:
Layer 1: consisting about 25% w/w PLA, and about 75% w/w PBSA;
Layer 2: consisting of about 5-45% w/w PBSA, about 50-75% w/w PLA and about 5-20% w/w Starch;
Layer 3: consisting of about 98-85% PBSA and about 2-15% w/w nanoclays;
Layer 4: consisting of about 5-45% w/w PBSA, about 50-75% w/w PLA and about 5-20% w/w Starch;
Layer 5: consisting about 25% w/w PLA, and about 75% w/w PBSA;

According to further embodiments, the multi-layered biodegradable sheet of the invention consists the following five layers:
Layer 1: consisting about 25% w/w PLA, and about 75% w/w PBSA;
Layer 2: consisting of about 5-41% w/w PBSA, about 46-69% w/w PLA, about 5-18% w/w Starch, and oxygen scavengers
Layer 3: consisting of about 98-85% PBSA and about 2-15% w/w nanoclays;
Layer 4: consisting of about 5-41% w/w PBSA, about 46-69% w/w PLA, about 5-18% w/w Starch, and oxygen scavengers
Layer 5: consisting about 25% w/w PLA, and about 75% w/w PBSA;

Although specific examples for mono-layered, three-layered and five-layered sheets were given herein, embodiments of the invention are directed to biodegradable sheets including any possible number of layers.

According to another embodiment, the biodegradable compositions of this invention are suitable for injection molding. Injection molding is used according to this invention to prepare any appropriate shape, including a means for removing liquid from a beverage receptacle, such as a spout, a straw, an opening covered by a cap, etc. The physical and mechanical properties of the injection molded biodegradable material according to this invention are as follows:

| | | |
|---|---|---|
| Specific Gravity | 1.0-1.5 | ASTM D792 |
| Melt volume rate (190° C./2.16 kg) [cm³/10 min] | 3.0-8.0 | ASTM D1238 |
| Melt flow rate (190° C./2.16 kg) [g/10 min] | 4.0-9.0 | ASTM D1238 |
| Tensile Strength & Break, (MPa) | 30-50 | ASTM D882 |
| Tensile Modulus, (MPa) | 800-1200 | ASTM D882 |
| Tensile Elongation, % | 200-400 | ASTM D882 |

According to some embodiments of the invention, the biodegradable composition that is molded by injection is prepared from 75% PBSA and 25% PLA. The physical and mechanical properties of this composition are as follows:

| | | |
|---|---|---|
| Specific Gravity | 1.25 | ASTM D792 |
| Melt volume rate (190° C./2.16 kg) [cm³/10 min] | 3.9 | ASTM D1238 |
| Melt flow rate (190° C./2.16 kg) [g/10 min] | 4.2 | ASTM D1238 |
| Tensile Strength @ Break, (MPa) | 32 | ASTM D882 |
| Tensile Modulus, (MPa) | 894 | ASTM D882 |
| Tensile Elongation, % | 339 | ASTM D882 |

The biodegradable sheet of the invention may be used for any application requiring such a sheet. According to one embodiment, the biodegradable sheet of the invention is used in the preparation of a receptacle for liquids, including water, beverages and liquid food matter.

According to one embodiment of the invention, there is provided a separable beverage receptacle packaging comprising a plurality of receptacle units possible of different volume, formed in a contiguous fashion, wherein each can be torn-off on demand. The separable beverage receptacle packaging may be made from a biodegradable material. In an embodiment of the invention, the separable beverage receptacle packaging is made from the biodegradable sheet described herein. According to one embodiment, the receptacle units are attached to one another in a side by side arrangement. According to another embodiment, the receptacle units are attached to one another so that the bottom of one unit is attached to the top of the other unit. According to further embodiments, the separable beverage receptacle packaging of the present invention comprises a plurality of receptacle units, any number of which may have a different volume and shape. According to further embodiments, at least two of the receptacle units have a different volume. According to one embodiment, at least one of the receptacle units is asymmetrical. According to further embodiments more than one of the receptacle units is asymmetrical.

Each receptacle (e.g., a pouch, a bag or any other type of essentially flexible receptacle) includes two sheets of flexible and sufficiently impermeable biodegradable material, such as the biodegradable compositions detailed herein. According to one embodiment, the biodegradable sheets are heat sealed along defined lines to create the individual receptacle units, which are separated from one another by a line of scored perforations that allows the individual receptacle units to be physically separated from one another. According to some embodiments, the perforation lines are adapted to provide receptacle units with different volumes that correspond to the amount of liquids regularly consumed by family members. According to one embodiment, the perforations between each two receptacle units are such that once detached there is no wasted material, i.e., there is no excess material found between the receptacle units that is not part of the receptacle unit itself.

The plurality of receptacle units, which are connected to one another, is related to herein as an array. The array of this invention comprises any number of receptacle units, any number of which may be of different shape and/or volume. According to one embodiment, the volume of each receptacle unit ranges from 100-500 ml. According to a further embodiment, the volume of each receptacle unit ranges from 200-350 ml. According to one embodiment, the shape of at least one receptacle unit is triangular. According to another embodiment, the shape of at least one receptacle unit is pyramidal.

According to one embodiment, the array is terminated with a hanger for efficient storage (see, e.g., FIGS. 6A-D and 7A-D). According to one embodiment, such a hanger is formed as a round hole in the array. According to this invention, each receptacle unit includes a compartment for storing liquids and a means for removing the liquids therefrom. The means for removing the liquids from the compartment include a straw (see, e.g., FIGS. 1, 2A-C, 6A-D and 7A-D), a conduit (see, e.g., FIGS. 3A-E), a spout, an opening covered by a cap (see, e.g., FIGS. 3F and 4A), an opening closed by a stopper and a foldable unit that when unfolded creates an opening through which liquids can exit the compartment (see, e.g., FIGS. 5A and 5B). According to some embodiments, the compartment does not comprise an opening; but rather an opening is formed by the movement of an element, such as a cap, attached to the compartment.

According to some embodiments, each receptacle unit comprises a compartment for storing liquid and a straw. According to one embodiment, the straw is hermetically sandwiched between the sheets of the compartment in such a way that it has two segments, an internal segment that is found inside the compartment and an external segment that is found outside the compartment. According to further embodiments, each receptacle unit further comprises a sealing edge for sealing the external segment of the straw that is also hermetically sandwiched between the sheets of the sealing edge. According to some embodiments, a perforated line is placed between the sealing edge and the compartment, which perforated line enables tearing off the sealing edge and exposing the external segment of the straw.

According to one embodiment of the invention, the straw includes two opposing members positioned between the external segment and the internal segment of the straw. These members are attached to the biodegradable sheets of the receptacle unit, e.g., by heat sealing them between the two sheets, which, therefore, prevent movements of the straw as well as leaks from around the straw. According to one embodiment, the members are tapered to as to ease their attachment to the receptacle unit.

According to further embodiments, the receptacle unit includes a compartment for storing liquids and a conduit, through which the liquids may be conjugated from the compartment. According to one embodiment, the conduit is formed from a continuation of the biodegradable sheets forming the compartment. According to one embodiment, the conduit is sealed at the end, e.g., by heat, and comprises a perforated line, which aids in opening the conduit and removing the liquids from the compartment, when desired. According to one embodiment, the conduit is folded over when not in use. According to a further embodiment, the conduit is attached to the side of the compartment when not in use.

According to the invention, the receptacle units are attached to one another at any appropriate location on each receptacle unit. According to one embodiment of the invention, the receptacle units are attached to one another in a side by side fashion, wherein the opening of each unit is positioned in any appropriate direction. According to one embodiment, the opening of each receptacle unit is either upwards or downwards, when the receptacle units are connected in a side by side fashion. According to one embodiment, the openings of the receptacle units alternate, i.e., the first pointing up (or down) and the next pointing down (or up). According to further embodiments, any number of openings is located on the side, front or back of the receptacle unit. According to this invention, any such opening may comprise a straw as detailed above.

According to another embodiment, the biodegradable sheets are used to manufacture pouches of larger volume, to be used as substitute to larger plastic bottles for feeding purified water dispensing appliances. In this case, the pouch will have a spout that perfectly matches the inlet of the water dispensing appliance. The pouch will have hanging members that allow for hanging of the pouch, such that the spout is the lowermost, in order to allow water to exit the pouch by gravity. According to one embodiment, before use, the spout is sealed by flexible material that may be pierced by a proper tip extending from the inlet of the water dispensing appliance. Alternatively, the pouch may be inserted into an adapter which receives the pouch, guides it towards the piercing tip and holds it in place, as long as it is not empty.

FIG. 1 illustrates the construction of an exemplary array of receptacle units (related to herein also as pouches) of different volume, formed in a contiguous side by side fashion wherein each can be torn off on demand. The array 10 may include a plurality of pouches of different volume (in this example, volumes of 200 ml, 250, 300 and 350 ml), such that the entire array is delimited within a size of 20×37 cm. Each pouch is separated from its neighboring pouches by a perforated curved line, for allowing optimal division of the delimited area between different pouches. Each individual pouch may be marked to show its volume and content, such as pouch 101.

FIG. 2A illustrates the layout of a single pouch, according to an embodiment of the invention. The pouch 101, which is torn off from array 10, comprises a compartment 102 for storing the liquid, an internal segment of straw 103 that is hermetically sandwiched between the sheets of the compartment 102 and a sealing edge 104 for sealing the external segment of straw 103 that is also hermetically sandwiched between the sheets of the sealing edge 104. A perforated line 105 is implemented between the sealing edge 104 and the compartment 102.

Figure 2C:
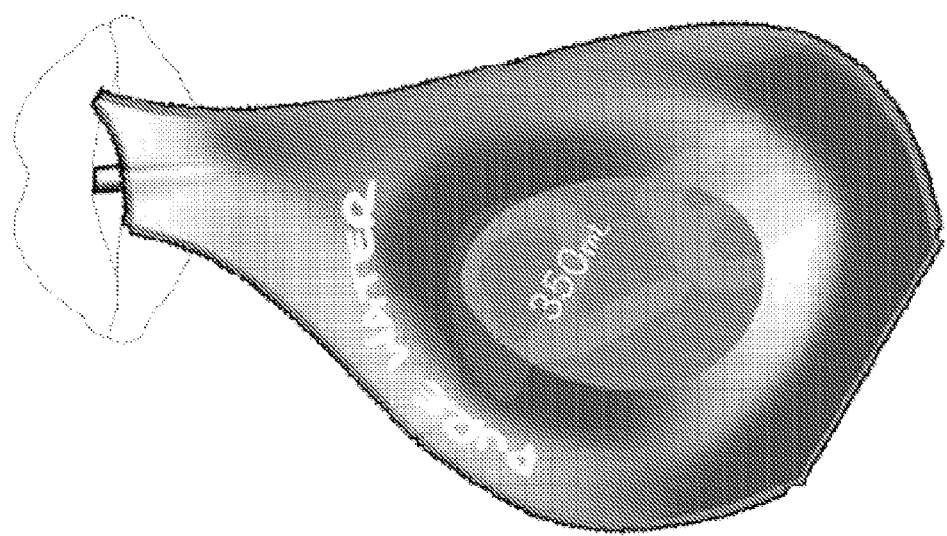

The user can tear off the sealing edge 104 along the perforated line 105 and remove the sealing edge 104 from the external segment of straw 103, as shown in FIG. 2B. This enables the user to drink the fluid via the external segment of straw 103, as shown in FIG. 2C.

Figure 2D:
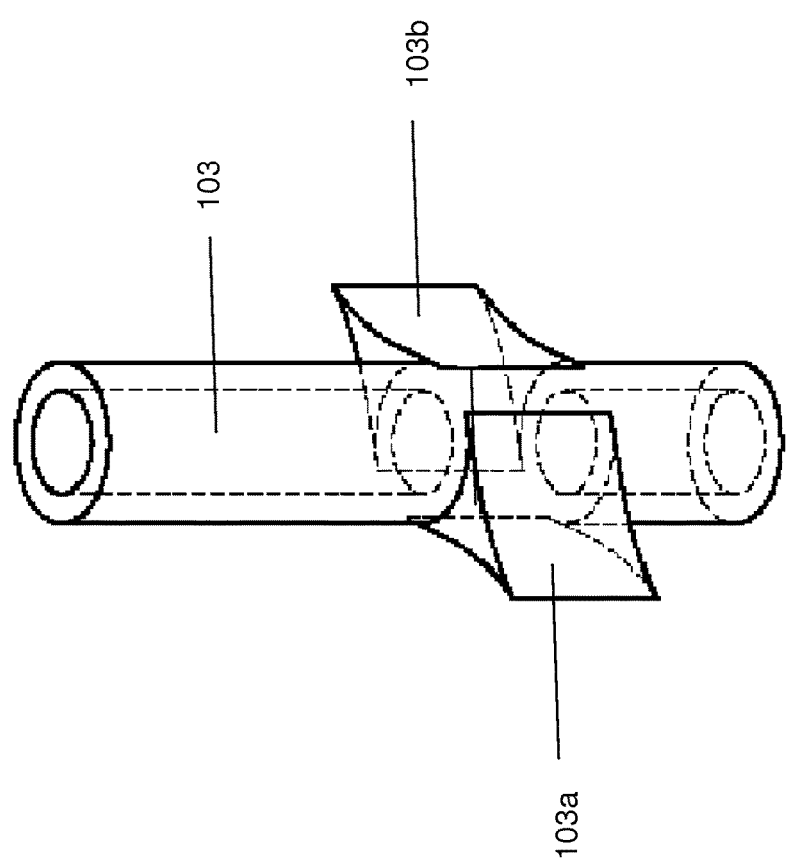
FIG. 2D illustrates the layout of an internal straw segment, according to an embodiment of the invention.

FIG. 2D illustrates the layout of an internal straw segment, according to an embodiment of the invention. The straw segment 103 has two opposing tapered members 103a and 103b extending outwardly, so as to be attached to (i.e., sandwiched between) the biodegradable impermeable sheets that define the compartment.

Figure 2E:
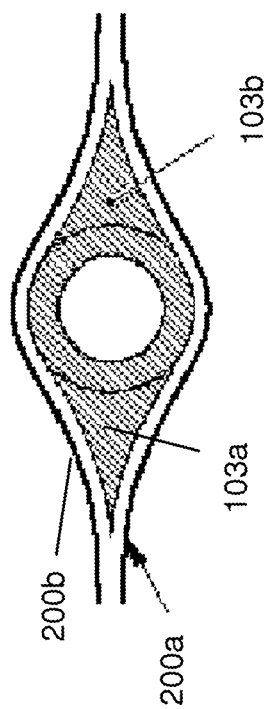
FIG. 2E illustrates a cross-sectional view of a sealed internal straw segment, according to an embodiment of the invention.

FIG. 2E illustrates a cross-sectional view of a sealed internal straw segment, according to an embodiment of the invention. The two opposing tapered members 103a and 103b are pressed between the two opposing biodegradable impermeable sheets 200, so as to obtain sealing pressure and prevent both movement of the straw and leaks from around it.

Figure 3A:
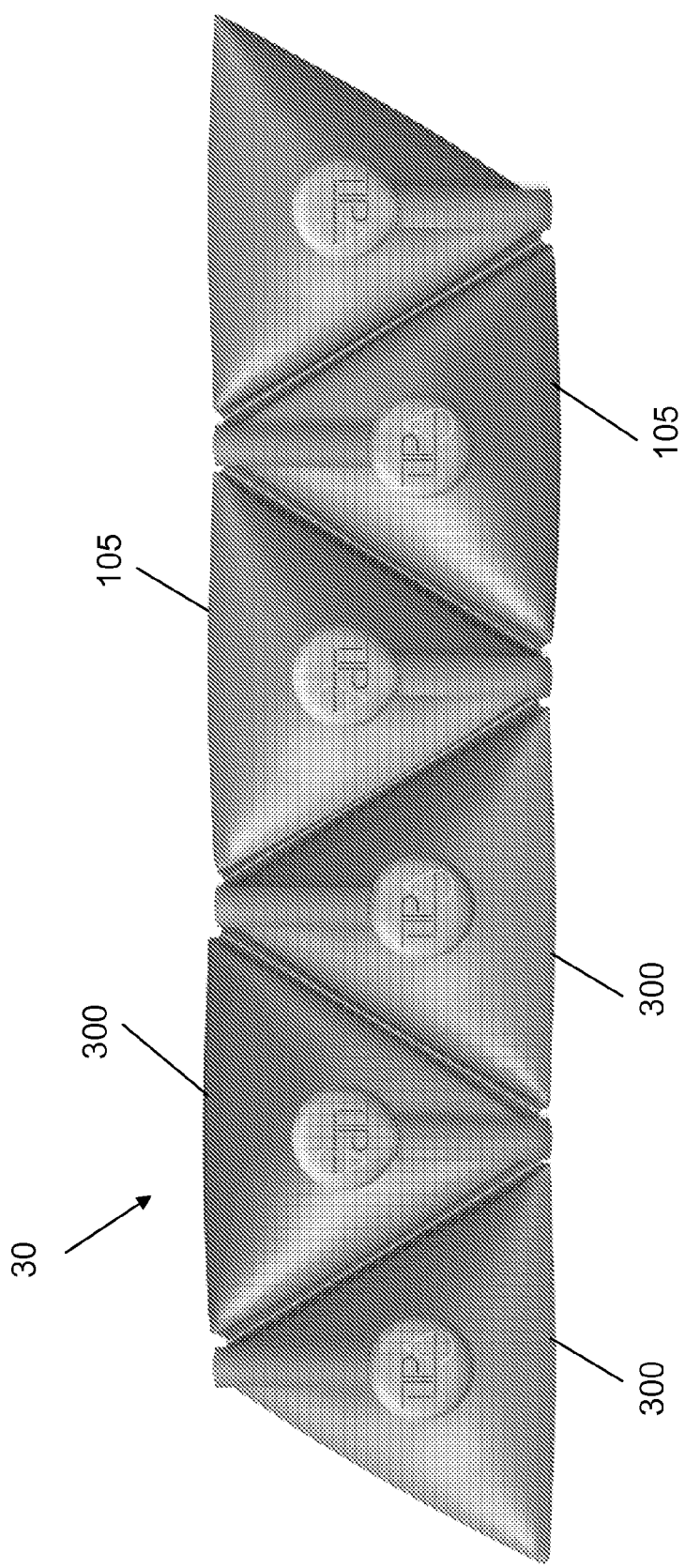
FIGS. 3A to 3F illustrate the layout of an array of six receptacle units, according to an embodiment of the invention.
Figure 3B:
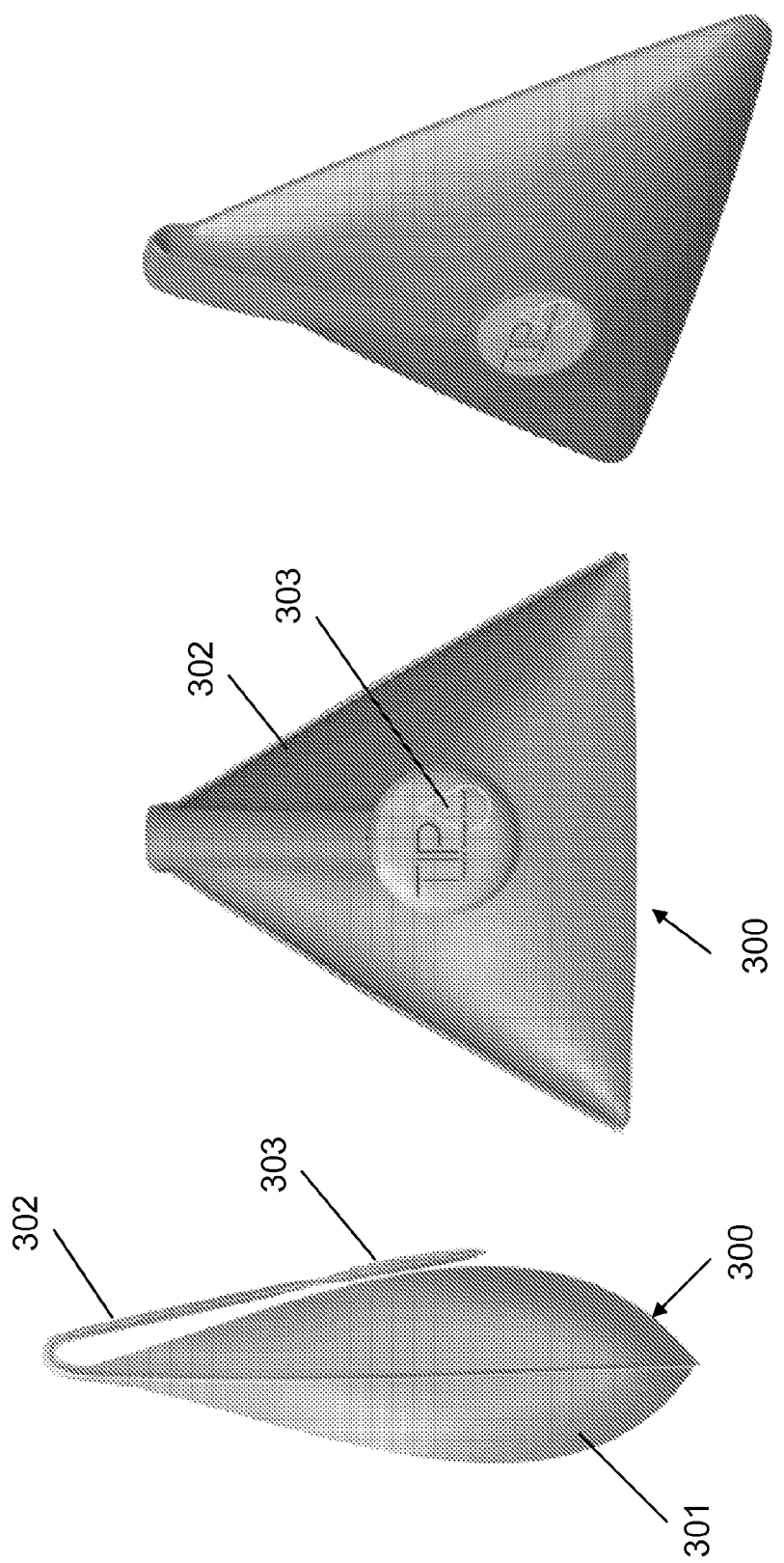

FIG. 3A illustrates the layout of an array of six pouches, according to an embodiment of the invention. Whenever needed, each pouch 300 can be torn-off from array 30 along the corresponding perforated line 105. The fluid storage compartment 301 of each single pouch 300 is terminated by a flat conduit 302 having a sealing edge 303 at its distal end, as shown in FIG. 3B (front view). Before use, the flat conduit 302 is bent (e.g., to form a U-shape) and the sealing edge 303 is attached to the side-wall of the pouch 300 (side view). The perforated line 105 may be of full length or of partial length.

Figure 3C:
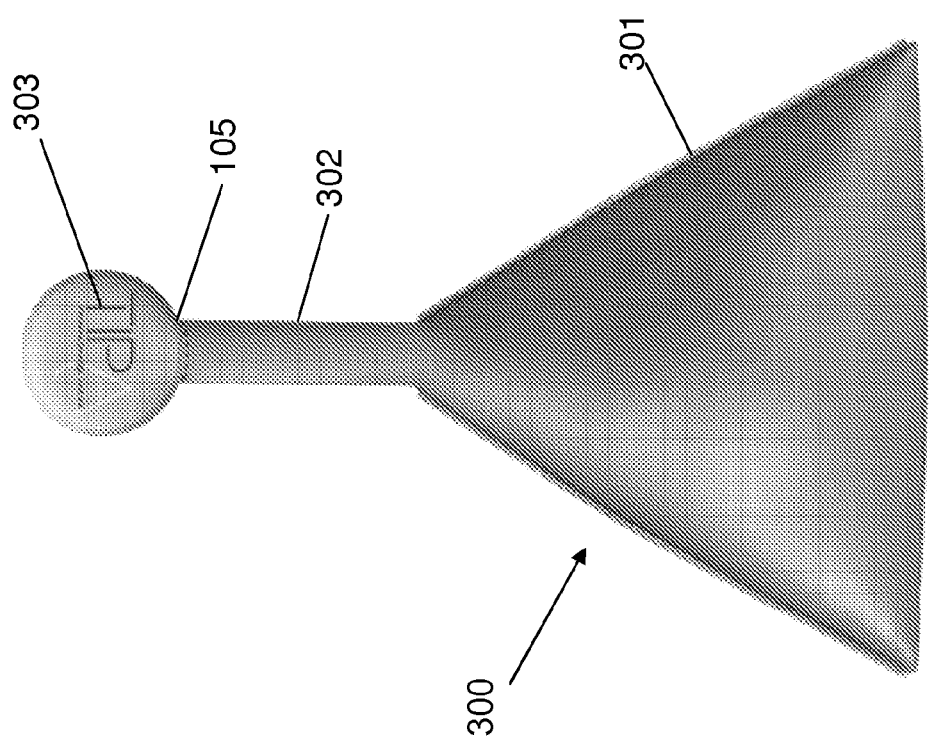
Figure 3D:
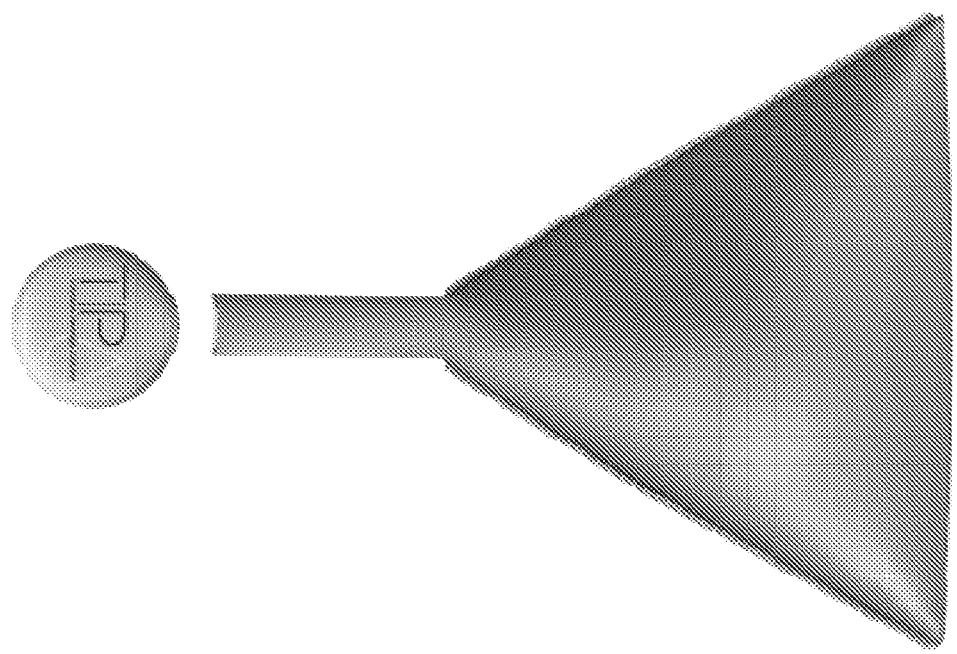
Figure 3E:
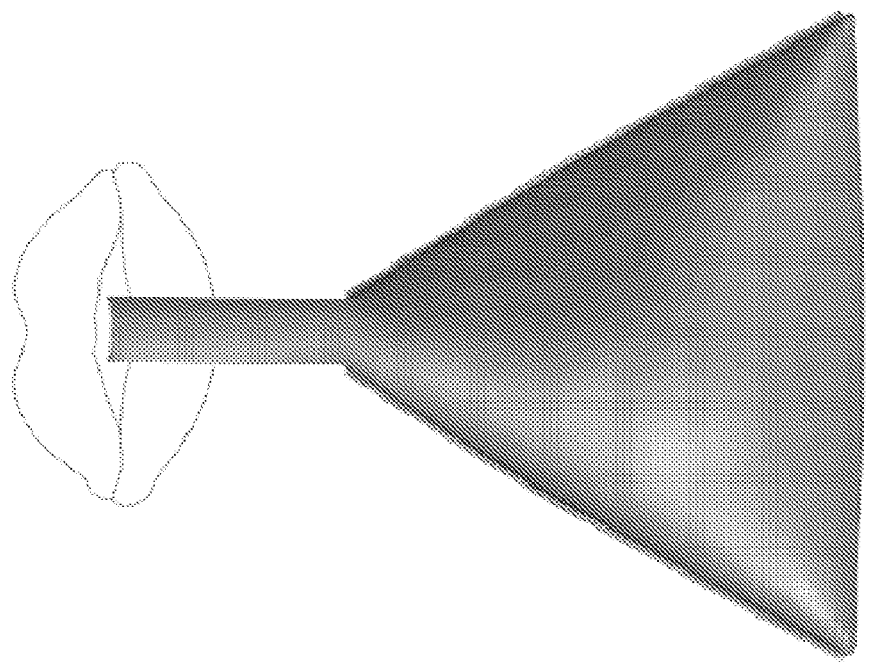

When the user wishes to drink, he first detaches the sealing edge 303 from the side-wall and straightens the flat conduit 302, as shown in FIG. 3C. Then he tears-off the sealing edge 303 along the perforated line 105 and removes the sealing edge 303 from the distal end of flat conduit 302, thereby breaking the sealing and opening the distal end, to form a straw segment, as shown in FIG. 3D. Now the user can drink the fluid via the distal end, as shown in FIG. 3E. The straw segment, as well as the sealing edge 303, may be made from the same biodegradable material that the pouch is made of.

Figure 3F:
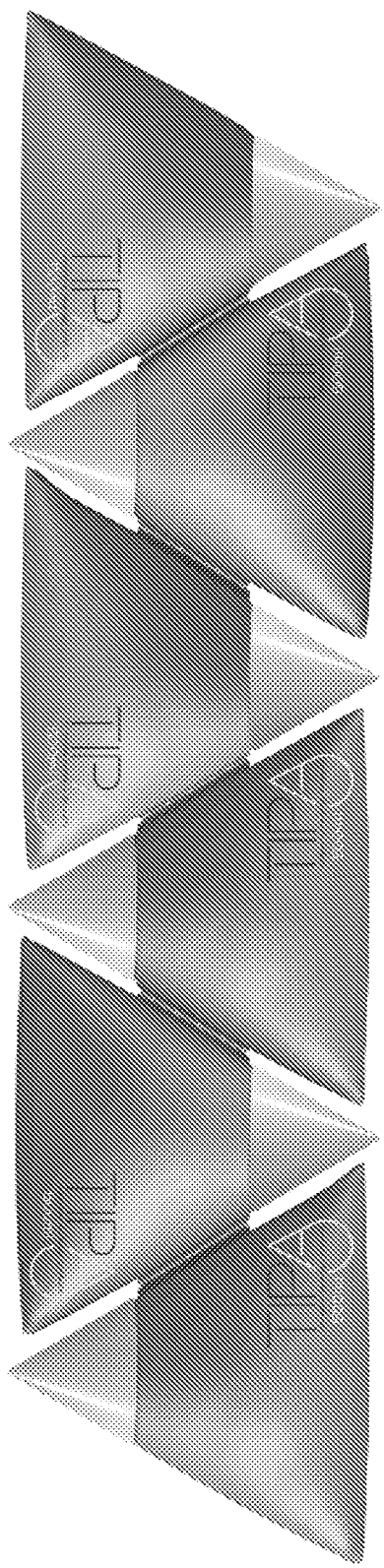

FIG. 3F illustrates an array of several receptacle units attached to one another in a side by side fashion so that the openings thereof alternate in an upward-downward position. As shown in FIG. 3F, only the middle portion of the various receptacle units is attached to one another.

Figure 4B:
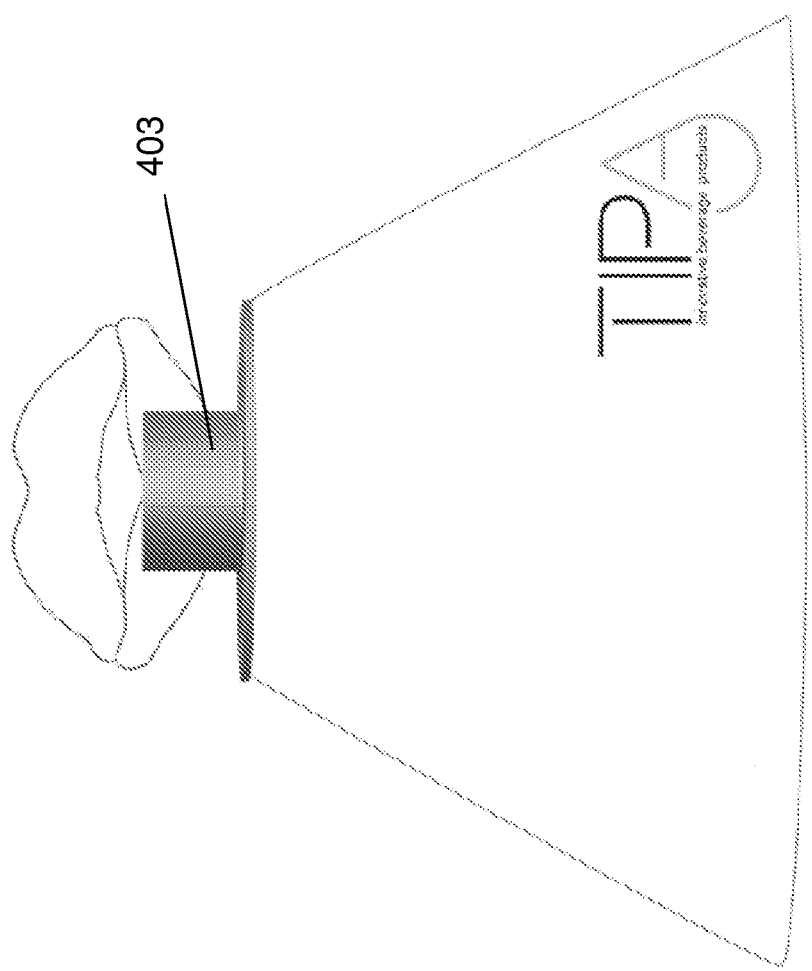
Figure 4C:
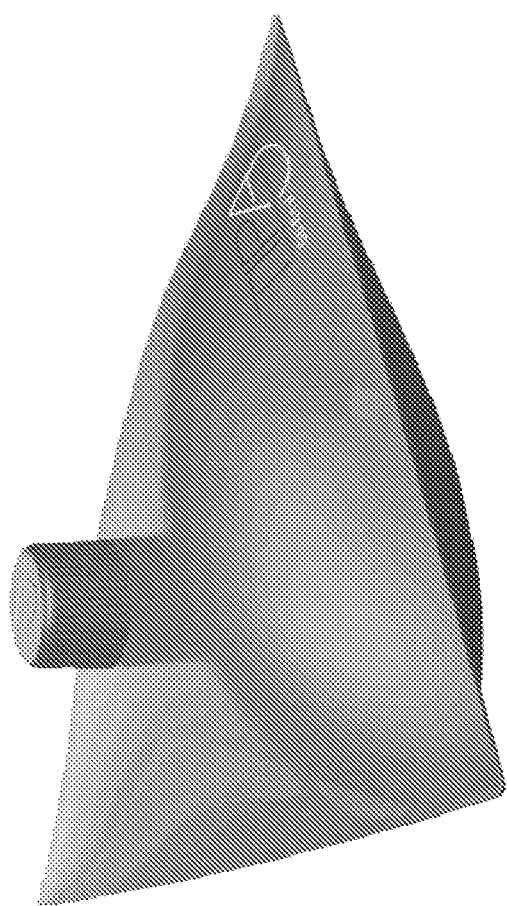

FIG. 4A illustrates the layout of a single pouch, according to another embodiment of the invention. The pouch 400 comprises a clipped compartment 401 for storing the liquid, which is terminated by a flat surface 402, from which a conduit segment 403 extends outwardly. The proximal end of conduit segment 103 is terminated with a sealing disc (not shown) that is a part of the flat surface 402. The sealing disc also has several niches formed therein, for receiving mating projections. The sealing disc is attached to the edges of the conduit segment 403 by a relatively weak layer that seals the compartment 401, but can be broken by applying a rotational shearing force on it. The shearing force may be applied by a top cover 404 that includes several projections 405. These projections 405 are designed to mate the formed niches, such that when the cover 404 is attached to the distal end of conduit segment 403, the niches formed in the sealing disc receive the mating projections 405 and remain unreleasably attached to them (e.g., by a unidirectional elastic connection). According to this embodiment, when the user wishes to drink, he has to rotate the top cover 404, to thereby break the weak layer and disconnect the sealing disc from the edges of the conduit segment 403. According to this embodiment, the sealing is broken and the user removes the top cover along with the sealing disc that is now attached to the top cover. Thus, the user can drink the fluid via the conduit segment 403, as shown in FIG. 4B. Alternatively, clipping of the compartment may be eliminated by locating the top cover in the middle of the sidewall, as shown in FIG. 4C. In this case, the pouch can be laid on any flat support. In both configurations, the top cover may be reused (screwed), so as to seal the conduit segment 403.

Figure 4D:
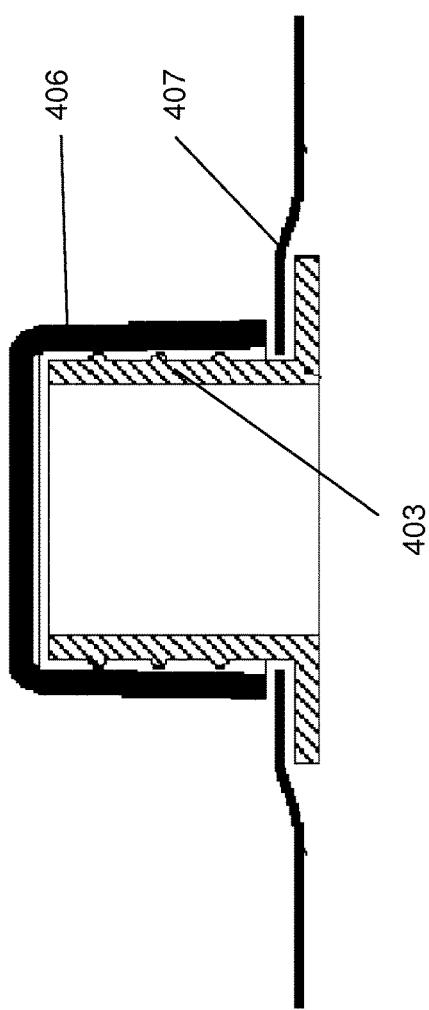
FIG. 4D is a cross-sectional view of the top cover sealing arrangement, according to another embodiment of the invention.

FIG. 4D is a cross-sectional view of the top cover sealing arrangement. In this arrangement, the top cover 406 is screwed on top of the conduit segment 403, which is heat welded to the edges of the biodegradable impermeable sheet 407, so as to obtain impermeable sealing.

Figure 5A:
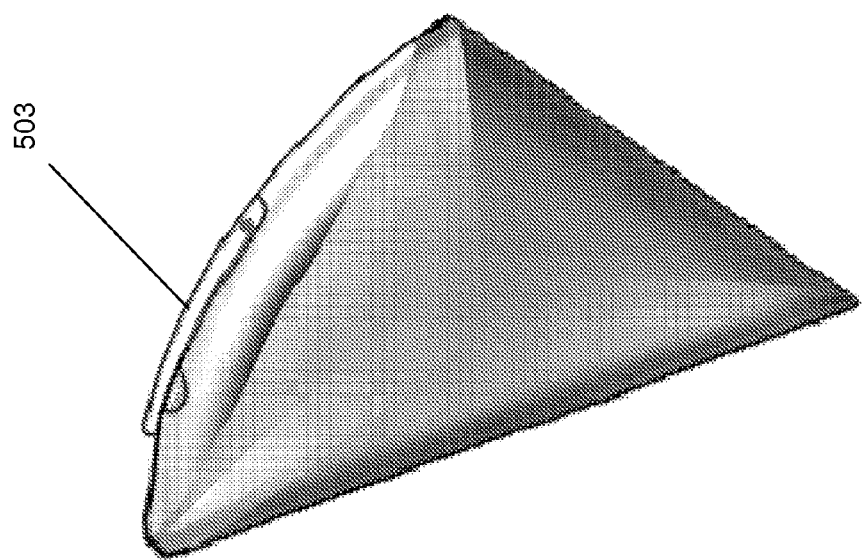
FIGS. 5A and 5B illustrate the layout of a single receptacle units with a pivotally foldable straw, according to another embodiment of the invention.
Figure 5B:
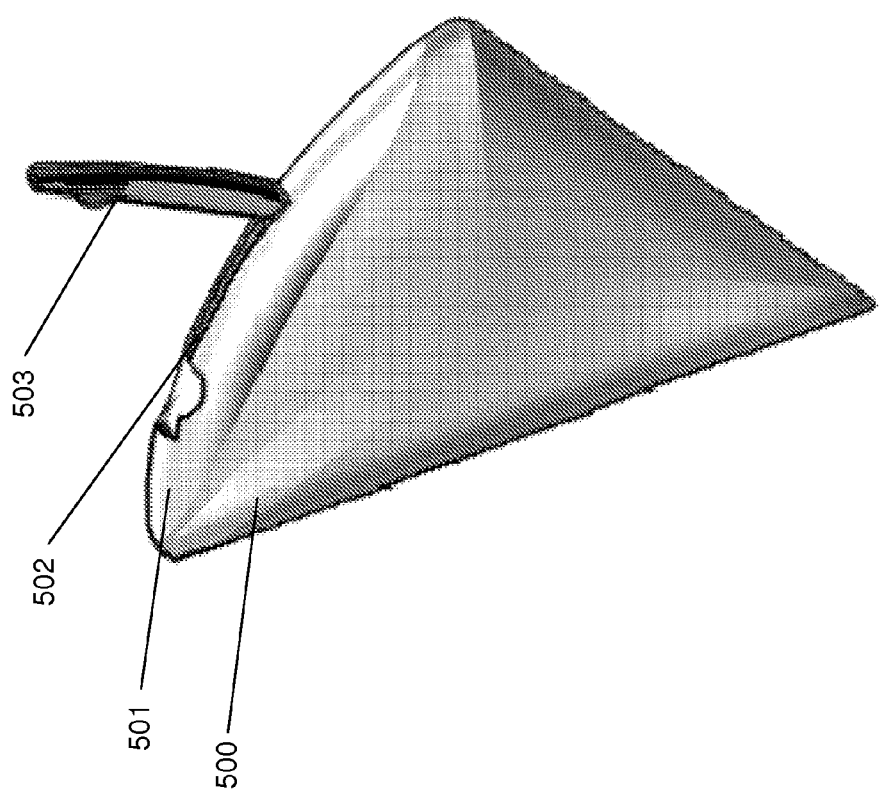

FIGS. 5A and 5B illustrate the layout of a single pouch with a pivotally foldable straw, according to another embodiment of the invention. The pouch 500 comprises a rigid arched member 501 attached to the edge of the pouch 500. Arched member 501 comprises an elongated groove 502 (cradle) for receiving a matching pivotally foldable rigid straw 503, which has a tubular conduit for allowing fluid to flow. Arched member 501 also comprises at its end a spherical tap (not shown) with an orifice into the pouch's cavity. This spherical tap is also used as a joint around which straw 503 can pivot. As long as the pouch is stored, straw 503 lies within groove 502 (as shown in FIG. 5A) and the tubular conduit does not overlap the orifice in the spherical tap. In this position the pouch is sealed. When the straw 503 is lifted to its vertical position (as shown in FIG. 5B), the tubular conduit overlaps the orifice in the spherical tap and fluid can flow out of the pouch via straw 503 into the user's mouth. The pouch can be sealed again by folding straw 503 back into the cradle after use. It is also possible to add a sealing sheet to the upper end of the orifice to increase the sealing level before use and to include a puncturing tip at the end of straw 503, such that the sealing sheet will be punctured when straw 503 is lifted to its vertical position.

Figure 6A:
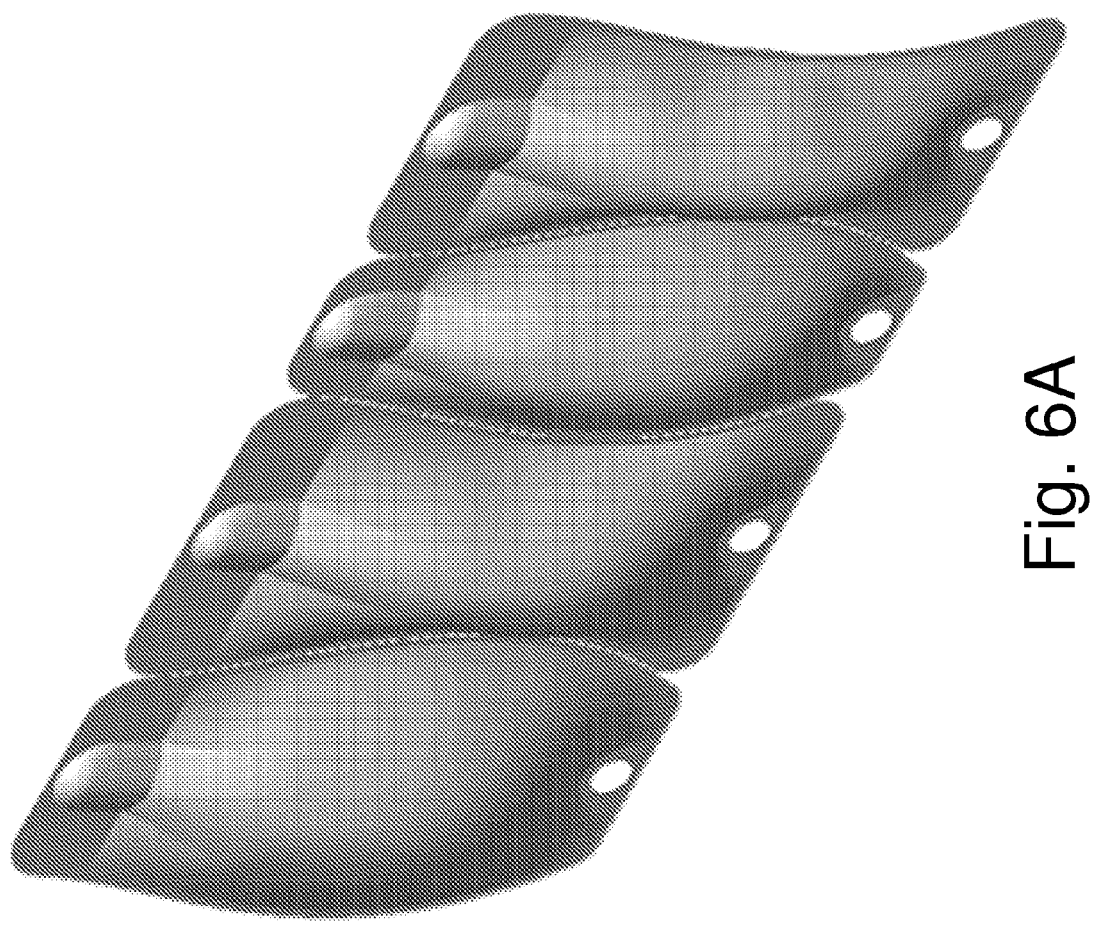
FIGS. 6A-D illustrate an array of four receptacle units, according to an embodiment of the invention, wherein all of the receptacle units are closed (FIG. 6A is an overview of the array, FIG. 6B is a front view of the array, FIG. 6C is a side view of the array and FIG. 6D is a top view of the array)
Figure 6C:
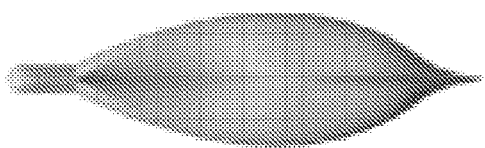
Figure 6B:
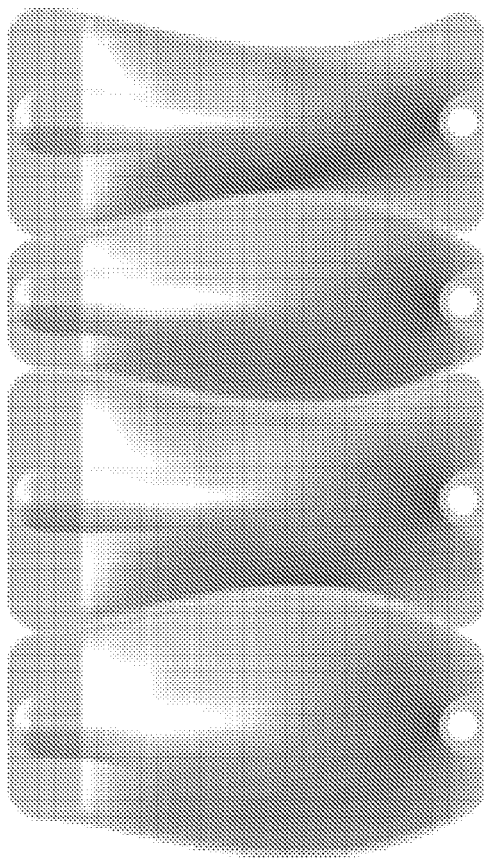
Figure 6D:
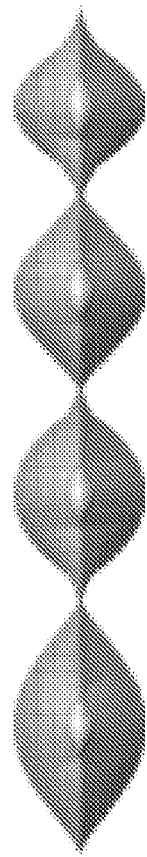

FIGS. 6A, 6B, 6C and 6D illustrate an array of four receptacle units, all of which are closed. FIG. 6A is an overview of the array, which include four separable receptacle units, separated from one another by perforated lines. Further, as shown in FIG. 6A, each of the receptacle units includes a straw at the top (closed in this figure) and a hole at the bottom, by which the receptacle unit can be hung from any type of hook, rope, twine, etc. FIG. 6B is a front view of the array, FIG. 6C is a side view of the array and FIG. 6D is a top view of the array.

Figure 7A:
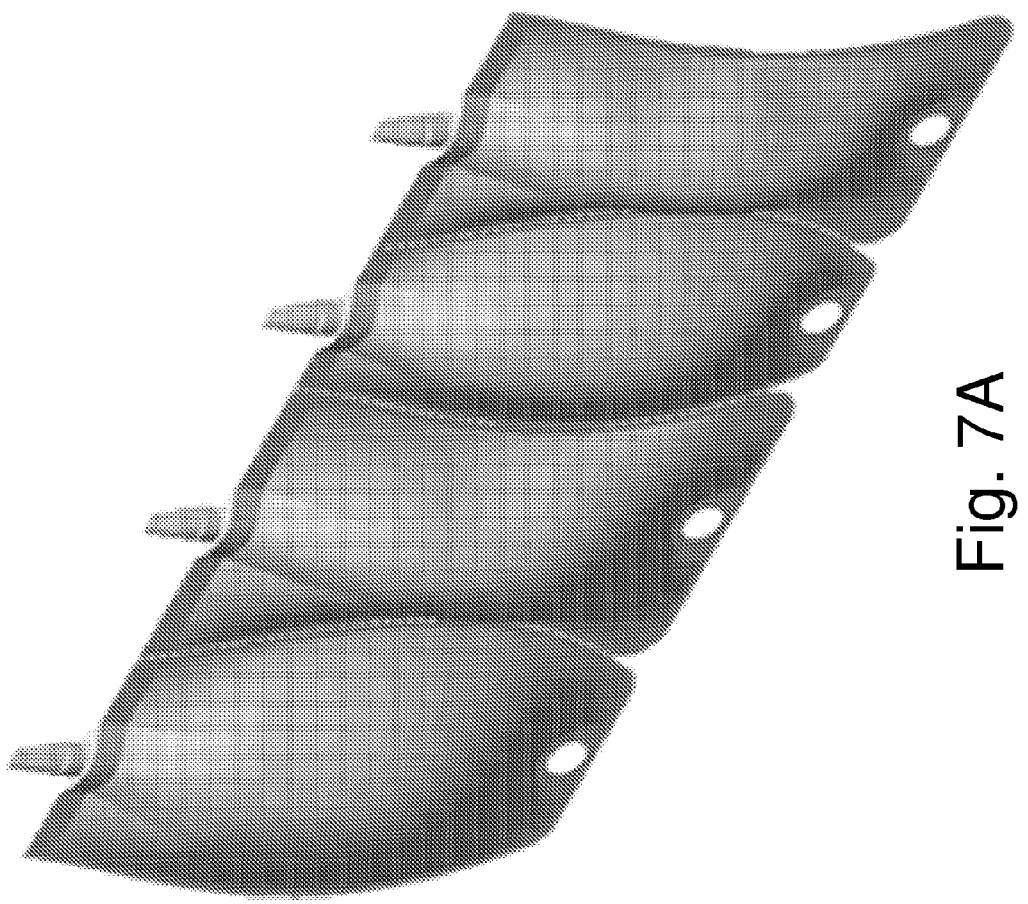
FIGS. 7A-D illustrate an array of four receptacle units, according to an embodiment of the invention, wherein all of the receptacle units are opened (FIG. 7A is an overview of the array, FIG. 7B is a front view of the array, FIG. 7C is a side view of the array and FIG. 7D is a top view of the array)
Figure 7C:
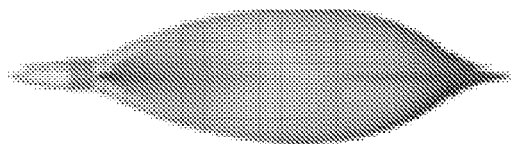
Figure 7B:
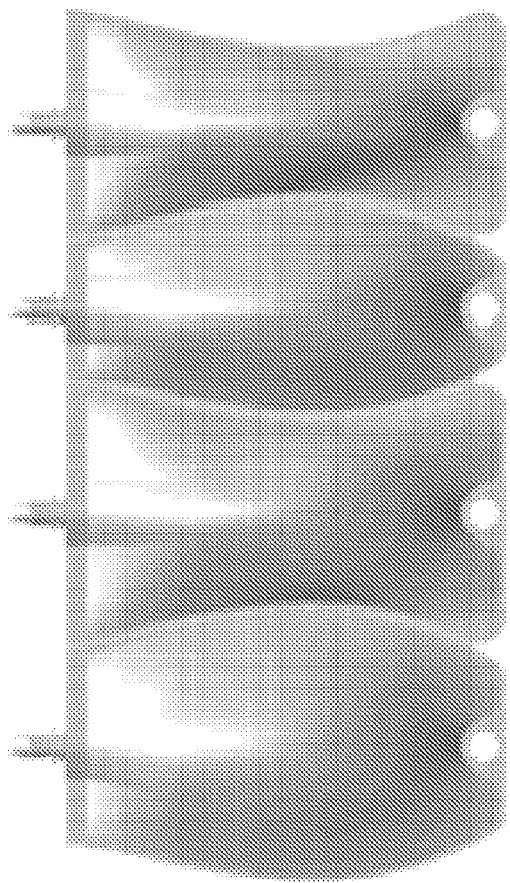
Figure 7D:
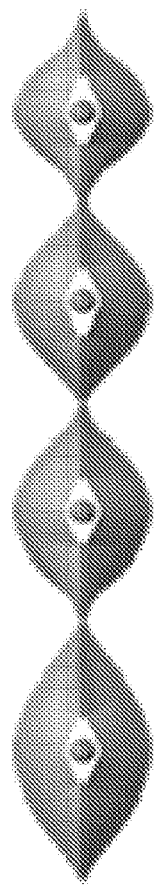

FIGS. 7A, 7B and 7C show the same array as shown in FIGS. 6A-D; however, in FIGS. 7A-D, all of the receptacle units are opened, having a straw protruding from the top of each unit. Specifically, FIG. 7A is an overview of the array, FIG. 7B is a front view of the array, FIG. 7C is a side view of the array and FIG. 7D is a top view of the array.

According to another embodiment, the biodegradable sheets are made of two laminated layers. The first layer is an inner layer, made of 10-50µ thick PLA that is in contact with the liquid. The second layer is an outer layer, made of 50-150µ thick starch that is exposed to the air. Both layers are attached to each other by an adhesive layer, the weight of which is less that 1% of the total weight of the laminated layers. This combination is unique, due to the fact that the laminated sheet is sufficiently impermeable to hold liquids, while being sufficiently flexible to allow efficient and comfortable production of pouches.

According to another embodiment, the biodegradable sheet, which is highly flexible and transparent and is suitable for carrying liquids, is made of Polylactic Acid (PLA) blended with additional biodegradable polyesters, such as: polybutylene succinate (PBS), polybutylene succinate adipate (PBSA), poly(tetramethylene adipate-coterephthalate) (PTAT), thermoplastic starch blends.

The Polylactic acids include poly(L-lactic acid), whose structural units are L-lactide acid; poly(D-lactide acid), whose structural units are D-lactic acid; poly(DL-lactic acid) which is a copolymer of L-lactic acid and D-lactic acid; and any mixture thereof.

Different combinations of the above mentioned polymers should be melt compounded using a twin-screw extruder. The polymer blends are extruded in the form of strands to form pellets. The pellets contain a physical mixture (blend) of the different polymers used. The blends are then extruded in a cast or a blow—film extruder in order to obtain films or sheets. In order to increase the barrier of the films and sheets, metalized laminates of the above described polymers can be obtained using an aluminum film or aluminum vapor deposition.

Various aspects of the invention are described in greater detail in the following Examples, which represent embodiments of this invention, and are by no means to be interpreted as limiting the scope of this invention.

EXAMPLES

Example 1

Single Layered Biodegradable Sheets

All of the single layered sheets related to herein were 15-120 microns thick.

Sheet #1: A single layered biodegradable sheet consisting of 33.3% w/w PLA, 33.3% w/w PBS and 33.3% w/w Ecoflex was prepared as follows:
A. Melt Extrusion compounding stage:
 1. 166.7 gr PLA, 166.7 gr PBS and 166.7 gr Ecoflex were dried overnight at a temperature of 50° C. under vacuum;
 2. the dried polymers were dry blended and placed in a two screw PRISM compounder;
 3. the polymers were melt extruded in the PRISM compounder set to the following profile:
  i) temperature profile: 170-175-180-185-190° C. (the Die is set to 190° C.);
  ii) screw speed: 250 rpm; and
  iii) pressure: 15-25 bar.
B. Cast extrusion stage:
 1. the melt extruded material was dried overnight at a temperature of 50° C. under vacuum;
 2. the material was placed into a Randcastle Extruder set to the following profile:
  i) 170-180-190° C.—180° C.—Adaptor; 185° C.—feedblock; Die—185° C.;
  ii) screw speed: 80 rpm; and
  iii) head pressure 590 bar.

The measured physical properties of Sheet #1 were as follows: Stress at Maximum Load was 25 Mpa, the Strain at Break was 415% and Young's Modulus was 679 Mpa.

Sheet #2: A single layered biodegradable sheet consisting of 20% w/w PLA and 80% w/w PBS was prepared using the same procedure described above for Sheet #1, wherein the amounts of the polymers used were 100 gr PLA and 400 gr PBS. The measured physical properties of Sheet #2 were as follows: Stress at Maximum Load was 47 Mpa, the Strain at Break was 731% and Young's Modulus was 569 Mpa.

Sheet #3: A single layered biodegradable sheet consisting of 20% w/w PLA, 40% w/w PBS and 40% Novamont CF was prepared using the same procedure described above for Sheet #1, wherein the amounts of the polymers used were 100 gr PLA, 200 gr PBS and 200 gr Novamont. The measured physical properties of Sheet #3 were as follows: Stress at Maximum Load was 33 Mpa, the Strain at Break was 579% and Young's Modulus was 603 Mpa.

Sheet #4: A single layered biodegradable sheet consisting of 60% w/w PLA and 40% w/w PBS was prepared using the same procedure described above for Sheet #1, wherein the amounts of the polymers used were 300 gr PLA and 200 gr PBS. The measured physical properties of Sheet #4 were as follows: Stress at Maximum Load was 40 Mpa, the Strain at Break was 240% and Young's Modulus was 1274 Mpa.

Sheet #5: A single layered biodegradable sheet consisting of 55% w/w PLA and 45% w/w PBS was prepared using the same procedure described above for Sheet #1, wherein the amounts of the polymers used were 275 gr PLA and 225 gr PBS. The measured physical properties of Sheet #5 were as follows: Stress at Maximum Load was 45 Mpa, the Strain at Break was 4% and Young's Modulus was 1414 Mpa.

As evident from their physical properties, as detailed above, Sheets #1-3 are advantageous one layered biodegradable sheets according to this invention. Further, as detailed above, although the composition of Sheets #4 and #5 is very similar, they highly differ in their physical properties, particularly in their strain at break. Therefore, it is obviously necessary to perform many experiments in order reach the desired physical properties.

Example 2

Three-layered Biodegradable Sheets

All of the three layered sheets related to herein were 100 microns thick.

Sheet #6: A three layered biodegradable sheet was prepared according to the procedure described above for Sheet #1, wherein the weight of each layer constitutes a third of the weight of the final sheet. The three layered Sheet #6 consists of the following three layers:
 Layer 1: 33.3% w/w PLA, 33.3% w/w PBS and 33.3% w/w Ecoflex Layer 2: 100% w/w PHA Layer 3: 33.3% w/w PLA, 33.3% w/w PBS and 33.3% w/w Ecoflex The measured physical properties of Sheet #6 were as follows: Stress at Maximum Load was 20 Mpa, the Strain at Break was 558% and Young's Modulus was 675 Mpa.

Sheet #7: A three layered biodegradable sheet was prepared according to the procedure described above for Sheet #1, wherein the weight of each layer constitutes a third of the weight of the final sheet. The three layered Sheet #7 consists of the following three layers:

Layer 1: 33.3% w/w PLA, 33.3% w/w PBSA and 33.3% w/w PBAT

Layer 2: 100% w/w PBAT

Layer 3: 33.3% w/w PLA, 33.3% w/w PBSA and 33.3% w/w PBAT

The measured physical properties of Sheet #7 were as follows: Stress at Maximum Load was 30 Mpa, the Strain at Break was 618% and Young's Modulus was 391 Mpa.

Sheet #8: A three layered biodegradable sheet was prepared according to the procedure described above for Sheet #1, wherein the weight of each layer constitutes a third of the weight of the final sheet. The three layered Sheet #8 consists of the following three layers:

Layer 1: 100% w/w PBS

Layer 2: 60% w/w PLA and 40% w/w PBS

Layer 3: 100% w/w PBS

The measured physical properties of Sheet #8 were as follows: Stress at Maximum Load was 44 Mpa, the Strain at Break was 4.1% and Young's Modulus was 1374 Mpa.

Sheet #9: A three layered biodegradable sheet was prepared according to the procedure described above for Sheet #1, wherein the weight of each layer constitutes a third of the weight of the final sheet. The three layered Sheet #9 consists of the following three layers:

Layer 1: 100% w/w Ecoflex

Layer 2: 50% w/w PLA and 50% w/w PBAT

Layer 3: 100% w/w Ecoflex

The measured physical properties of Sheet #9 were as follows: Stress at Maximum Load was 38 Mpa, the Strain at Break was 559% and Young's Modulus was 837 Mpa.

As evident from their physical properties, as detailed above, Sheets #6-7 are advantageous three layered biodegradable sheets according to this invention.

In all of the above sheets, layer 2 is sandwiched between layers 1 and 3 so that layers 1 and 3 are on the outside of the three layered biodegradable sheet and have contact with the outside atmosphere and layer 2 is positions between them so that it does not contact the outside atmosphere.

Example 3

Physical, Mechanical, Thermal and Barrier Properties of Monolayer, Three-layered and Five-layered Biodegradable Sheets Sheet #10: A monolayered biodegradable sheet consisting of 25% w/w PLA and 75% w/w PBSA was prepared using the same procedure described above for Sheet #1, wherein the amounts of the polymers used were 125 gr PLA and 375 gr PBS. The measured physical, mechanical, thermal and barrier properties of Sheet #10 were as follows:

| Physical Properties | | |
|---|---|---|
| Specific Gravity | 1.25 | ASTM D792 |
| Melt volume rate (190° C./2.16 kg) [cm3/10 min] | 3.9 | ASTM D1238 |
| Melt flow rate (190° C./2.16 kg) [g/10 min] | 4.2 | ASTM D1238 |

| Mechanical Properties | | |
|---|---|---|
| Tensile Strength @ Break, (MPa) | 32 | ASTM D882 |
| Tensile Modulus, (MPa) | 894 | ASTM D882 |
| Tensile Elongation, % | 339 | ASTM D882 |
| Notched Izod Impact, (J/m) | 536 | ASTM D256 |

| Thermal properties | | |
|---|---|---|
| Heat distortion temperature HDT [° C./18.5 kg/cm$^2$] | 45 | ASTM D648 |

| Barrier properties | |
|---|---|
| OTR (oxygen transmittance from bottle) | 0.3 cc/pack/day |

Sheet #11: A three layered biodegradable sheet was prepared according to the procedure described above for Sheet #1, wherein the weight of each layer constitutes a third of the weight of the final sheet. The three layered Sheet #11 consists of the following three layers:

Layer 1: consisting about 25% w/w PLA and about 75% w/w PBSA;

Layer 2: consisting about 100% w/w PBSA; and

Layer 3: consisting about 25% w/w PLA and about 75% w/w PBSA.

The measured physical, mechanical and barrier properties of sheet #11 were as follows:

| Physical Properties | |
|---|---|
| Light transmittance (%) | 88 |

| Mechanical Properties | | |
|---|---|---|
| Tensile Strength @ Break, MD (MPa) | 24 | ASTM D882 |
| Tensile Strength @ Break, TD (MPa) | 22 | ASTM D882 |
| Tensile Modulus, MD (MPa) | 527 | ASTM D882 |
| Tensile Modulus, TD (MPa) | 392 | ASTM D882 |
| Tensile Elongation, MD % | 319 | ASTM D882 |
| Tensile Elongation, TD % | 463 | ASTM D882 |

| Barrier properties | | |
|---|---|---|
| WVTR [water transmittance, g/(m2 · d)] | 48.4 | ASTM E96 |
| OTR [cm3/(m2 · d · bar)] | 54.1 | ASTM D3985 |

Sheet #12: A five layered biodegradable sheet was prepared according to the procedure described above for Sheet #1, wherein the thickness of each of layers 1 and 5 constitutes about 30% of the total thickness, the thickness of each of layers 2 and 4 constitutes about 15% of the thickness final sheet, and the thickness of layer 3 constitutes about 10% of the thickness of the final sheet. It is noted that since the materials have approximately the same density, the weight ratio is about the same as the thickness ratio. The five layered Sheet #12 consists of the following five layers:

Layer 1: consisting about 25% w/w PLA and about 75% w/w PBSA;
Layer 2: consisting about 100% w/w PBSA;
Layer 3: consisting about 100% w/w PVOH;
Layer 4: consisting about 100% w/w PBSA; and
Layer 5: consisting about 25% w/w PLA and about 75% w/w PBSA.

The measured physical, mechanical and barrier properties of sheet #12 were as follows:

| Physical Properties | |
| --- | --- |
| Light transmittance (%) | 88 |

| Mechanical Properties | | |
| --- | --- | --- |
| Tensile Strength @ Break, MD (MPa) | 32 | ASTM D882 |
| Tensile Strength @ Break, TD (MPa) | 27 | ASTM D882 |
| Tensile Modulus, MD (MPa) | 464 | ASTM D882 |
| Tensile Modulus, TD (MPa) | 596 | ASTM D882 |
| Tensile Elongation, MD % | 687 | ASTM D882 |
| Tensile Elongation, TD % | 447 | ASTM D882 |

| Barrier properties | | |
| --- | --- | --- |
| WVTR [g/(m2 · d)] | 57.0 | ASTM E96 |
| OTR [cm3/(m2 · d · bar)] | 2.2 | ASTM D3985 |

Sheet #13: A five layered biodegradable sheet was prepared according to the procedure described above for Sheet #1, wherein the thickness of each of layers 1 and 5 constitutes about 30% of the total thickness, the thickness of each of layers 2 and 4 constitutes about 15% of the thickness final sheet, and the thickness of layer 3 constitutes about 10% of the thickness of the final sheet. It is noted that since the materials have approximately the same density, the weight ratio is about the same as the thickness ratio The five layered Sheet #13 consists of the following five layers:
Layer 1: consisting about 25% w/w PLA and about 75% w/w PBSA;
Layer 2: consisting of PBSA and about 20% w/w nano-kaolin;
Layer 3: consisting about 100% w/w PVOH;
Layer 4: consisting of PBSA and about 20% w/w nano-kaolin; and
Layer 5: consisting about 25% w/w PLA and about 75% w/w PBSA.

The barrier properties of sheet #13 were as follows:

| Barrier properties | | |
| --- | --- | --- |
| WVTR [g/(m2 · d)] | 30.0 | ASTM E96 |
| OTR [cm3/(m2 · d · bar)] | 2.0 | ASTM D3985 |

As evident from the above results, the addition of PVOH to the biodegradable sheet lowers the OTR and the further addition of nanoclays lowers the WVTR.

Example 4

Biodegradability

Sheet #14: A three layered biodegradable sheet was prepared according to the procedure described above for Sheet #1, wherein the weight of each layer constitutes a third of the weight of the final sheet. The three layered Sheet #14 consists of the following three layers:
Layer 1: consisting about 75% w/w PLA and about 25% w/w PBSA;
Layer 2: consisting about 100% w/w PBSA; and
Layer 3: consisting about 75% w/w PLA and about 25% w/w PBSA.

According to ISO 14855-2 the reference material used was microcrystalline cellulose. The graph presented in FIG. 8 shows the percentage degree of degradation of Sheet #14 (columns N1 and N2) in comparison to the reference (columns N3 and N4). Other than the sheet in columns N1 and N2 and the microcrystalline cellulose in columns N3 and N4, the columns were filled with compost. Throughout this test, the temperature of the columns was kept at 58° C.

Example 5

Melt extrusion reactive compounding stage: 37.5 kg of PBS and 25 kg of PVOH were dried on a Shini SCD-160U-120H dryer, for 8 hours prior to use. The dried polymers were dry blended and mixed with 100.0 gram of maleic anhydride (MAH), and 50.2 grams of Azobisisobutyronitrile (AIBN). The mixture was placed in a two screw PILOT compounder at a temperature of 150-190° C., screw speed of 300-450 RPM, and a pressure of 20-45 bar. Thus produced is a compound of PVOH grafted with MAH, and slightly crosslinked with PBS that is also grafted with the MAH. This compound is related to herein as PVOH-g-PBS. The PVOH-g-PBS compound is pelletized and dried before any following process. The PVOH-g-PBS was used as central layer in three layer sheets or as layers two and four in five layered sheets, using cast co-extrusion extruder, as detailed below.

Cast co-extrusion stage:
1. The melt extruded materials were dried overnight at a temperature of 50° C. on a Shini SCD-160U-120H dryer;
2. The material were placed into a Collin co-extrusion lines, and set to the following profile:
Extruder A) 190-200-220° C.—200° C.—Adaptor; 220° C.—feedblock; Die—210° C.; screw speed: 80 rpm
Extruder B) 190-220-230° C.—200° C.—Adaptor; 230° C.—feedblock; Die—230° C.; screw speed: 45 rpm
Extruder C) 190-200-220° C.—200° C.—Adaptor; 220° C.—feedblock; Die—210° C.; screw speed: 80 rpm
Head pressure 50 bar.

The polymer melt is coextruded into a multi-layer manifolds and a film die, and collected using a roll mill. The following multi layered sheets were produced using the equipment as detailed below:

Sheet #1: A three layered biodegradable film with hygroscopic oxygen and a water barrier compound:
Layers 1 and 3 of sheet #1 are prepared from a compound of PBSA/PLA having 75/25% w/w of the two polymers, respectively, which was produced using a polymer compounder by dry mixing the different polymers and blending the polymers in a molten state to form a compound.

The middle layer (layer 2) of Sheet #1 is prepared from the PVOH-g-PBS compound, produced as detailed above. The final three layered polymer sheet was produced according to the cast co-extrusion stage, as detailed above.

The measured physical properties of Sheet #1 were as follows: Tensile strength at break was 26 Mpa, the Strain at Break was 136% and Young's Modulus was 770 Mpa.

Sheet #2: A three layered biodegradable film with hygroscopic oxygen and a water barrier compound:

Layers 1 and 3 of Sheet #2 were prepared from a compound of PBSA/PLA having 75/25% w/w of the two polymers, respectively, which were produced similarly to layers 1 and 3 of Sheet #1, as detailed above. Sheet #2 further comprises a middle layer (layer 2) prepared from a compound of PVOH that was not further treated. The final polymer sheet was produced according to the cast co-extrusion stage, as detailed above.

The measured physical properties of Sheet #2 were as follows: Tensile strength at break was 28 Mpa, the Strain at Break was 139% and Young's Modulus was 1263 Mpa.

Sheet #3: A three layered film, comprising layers 1 and 3 of compound of PBSA/PLA with 75/25% w/w, produced similarly to the procedure detailed for Sheet #1, and a middle layer (layer 2) prepared from a compound of PBS. The final polymer sheet was produced according to the cast co-extrusion stage, as detailed above.

The measured physical properties of Sheet #3 were as follows: Tensile strength at break was 33 Mpa, the Strain at Break was 214% and Young's Modulus was 619 Mpa.

Sheet #4: A three layered film, wherein layers 1 and 3 are prepared from a compound of PBSA/PLA having a 75/25% w/w ratio of the two polymers, respectively, and a middle layer (layer 2) prepared from a compound of PBSA. The final polymer sheet was produced according to the cast co-extrusion stage, as detailed above.

The measured physical properties of Sheet #4 were as follows: Tensile strength at break was 28 Mpa, the Strain at Break was 203% and Young's Modulus was 426 Mpa.

Sheet #5: A five layered film, wherein layers 1 and 5 are prepared from a compound of PBSA/PLA having a polymer ratio of 75/25% w/w, respectively, which was prepared similarly to layers 1 and 3 sheet #1. Layers 2, 3 and 4 of Sheet #5 were prepared from a compound of PVOH-g-PBS, prepared using the same procedure described above regarding layer 2 of Sheet #1.

The measured physical properties of Sheet #5 were as follows: Tensile strength at break was 34 Mpa, the Strain at Break was 100% and Young's Modulus was 1009 Mpa.

Sheet #6: Five layered biodegradable film with hygroscopic oxygen and water barrier compound A five layered film, wherein layers 1 and 5 are prepared from a compound of PBSA/PLA with a polymer ratio of 75/25% w/w, respectively, which were produced similarly to layers 1 and 3 of sheet #1. Layers 2 and 4 of Sheet #6 were prepared from a compound of PVOH-g-PBS that was prepared using the same procedure described above for Sheet #1. Layer 3 of Sheet #6 was prepared from a compound of PVOH without further treatment. The final polymer sheet was produced according to the cast co-extrusion stage, as detailed above. The measured physical properties of Sheet #6 were as follows: Tensile strength at break was 42 Mpa, the Strain at Break was 160% and Young's Modulus was 1509 Mpa.

Sheet #7: A five layered film, wherein layers 1 and 5 were prepared from compound of PBSA/PLA with a polymers ratio of 75/25% w/w, respectively, which were produced similarly to layers 1 and 3 of Sheet #1. Layers 2 and 4 were prepared from a compound of PBSA/PLA having a polymer ratio of 75/25% w/w, respectively, and the middle layer (layer 3) was prepared from a compound of PVOH without further treatment. The final polymer sheet was produced according to the cast co-extrusion, as detailed above.

The measured physical properties of Sheet #7 were as follows: Tensile strength at break was 38 Mpa, the Strain at Break was 197% and Young's Modulus was 1430 Mpa.

Sheet #8: A five layered film, wherein layers 1 and 5 were prepared from a compound of PBSA/PLA having a polymer ratio of 75/25% w/w, respectively, produced similarly to layers 1 and 3 of Sheet #1. Layers 2, and 4 of Sheet 8 were prepared from a compound of PVOH-g-PBS, prepared using the same procedure described above for Sheet #1. Layer 3 of Sheet #8 was prepared from a compound of PBS, without further treatment. The final polymer sheet was produced according to the cast co-extrusion stage, as detailed above.

The measured physical properties of Sheet #8 were as follows: Tensile strength at break was 33 Mpa, the Strain at Break was 53% and Young's Modulus was 700 Mpa.

Sheet #9: A five layered film, where layers 1 and 5 were prepared from a compound of PBSA/PLA having a polymer ration of 75/25% w/w, respectively, produced similarly to layers 1 and 3 of Sheet #1. Layers 2 and 4 of Sheet #9 were prepared form a compound of PVOH-g-PBS, and the middle layer of Sheet #9, layer 3, was prepared from a compound of PBSA, without further treatment. The final polymer sheet was produced according to the cast co-extrusion stage, as detailed above.

The measured physical properties of Sheet #9 were as follows: Tensile strength at break was 23 Mpa, the Strain at Break was 180% and Young's Modulus was 603 Mpa.

Table 1a-c: Summary of the mechanical properties for the multilayered polymer sheets.

TABLE 1a

| Sheet # | layer 1 | layer 2 | layer 3 | layer 4 | layer 5 | Tensile Strength @ Break, MD (MPa) ASTM D882 |
|---|---|---|---|---|---|---|
| 1 | PBSA/PLA | PVOH-g-PBS | PBSA/PLA | | | 26 |
| 2 | PBSA/PLA | PVOH | PBSA/PLA | | | 28 |
| 3 | PBSA/PLA | PBS | PBSA/PLA | | | 33 |
| 4 | PBSA/PLA | PBSA | PBSA/PLA | | | 28 |
| 5 | PBSA/PLA | PVOH-g-PBS | PVOH-g-PBS | PVOH-g-PBS | PBSA/PLA | 34 |
| 6 | PBSA/PLA | PVOH-g-PBS | PVOH | PVOH-g-PBS | PBSA/PLA | 42 |
| 7 | PBSA/PLA | PBSA/PLA | PVOH | PBSA/PLA | PBSA/PLA | 38 |
| 8 | PBSA/PLA | PVOH-g-PBS | PBS | PVOH-g-PBS | PBSA/PLA | 33 |
| 9 | PBSA/PLA | PVOH-g-PBS | PBSA | PVOH-g-PBS | PBSA/PLA | 23 |

TABLE 1b

| Sheet # | layer 1 | layer 2 | layer 3 | layer 4 | layer 5 | Tensile Elongation, MD % ASTM D882 |
|---|---|---|---|---|---|---|
| 1 | PBSA/PLA | PVOH-g-PBS | PBSA/PLA | | | 136 |
| 2 | PBSA/PLA | PVOH | PBSA/PLA | | | 139 |
| 3 | PBSA/PLA | PBS | PBSA/PLA | | | 214 |
| 4 | PBSA/PLA | PBSA | PBSA/PLA | | | 203 |
| 5 | PBSA/PLA | PVOH-g-PBS | PVOH-g-PBS | PVOH-g-PBS | PBSA/PLA | 100 |
| 6 | PBSA/PLA | PVOH-g-PBS | PVOH | PVOH-g-PBS | PBSA/PLA | 159 |
| 7 | PBSA/PLA | PBSA/PLA | PVOH | PBSA/PLA | PBSA/PLA | 197 |
| 8 | PBSA/PLA | PVOH-g-PBS | PBS | PVOH-g-PBS | PBSA/PLA | 53 |
| 9 | PBSA/PLA | PVOH-g-PBS | PBSA | PVOH-g-PBS | PBSA/PLA | 180 |

TABLE 1c

| Sheet # | layer 1 | layer 2 | layer 3 | layer 4 | layer 5 | Tensile Modulus, MD (MPa) ASTM D882 |
|---|---|---|---|---|---|---|
| 1 | PBSA/PLA | PVOH-g-PBS | PBSA/PLA | | | 771 |
| 2 | PBSA/PLA | PVOH | PBSA/PLA | | | 1263 |
| 3 | PBSA/PLA | PBS | PBSA/PLA | | | 619 |
| 4 | PBSA/PLA | PBSA | PBSA/PLA | | | 426 |
| 5 | PBSA/PLA | PVOH-g-PBS | PVOH-g-PBS | PVOH-g-PBS | PBSA/PLA | 1009 |
| 6 | PBSA/PLA | PVOH-g-PBS | PVOH | PVOH-g-PBS | PBSA/PLA | 1509 |
| 7 | PBSA/PLA | PBSA/PLA | PVOH | PBSA/PLA | PBSA/PLA | 1429 |
| 8 | PBSA/PLA | PVOH-g-PBS | PBS | PVOH-g-PBS | PBSA/PLA | 700 |
| 9 | PBSA/PLA | PVOH-g-PBS | PBSA | PVOH-g-PBS | PBSA/PLA | 603 |

Table 1a-c demonstrates the mechanical properties of the multilayered polymer sheets (Sheets #1-#9, as detailed above). While the tensile strength (23-42 MPa) remains similar for all compositions, the tensile modulus is decreasing with the use of the PVOH-g-PBS, making the final films more flexible. It is noted that Table 1 and the results above summarize the mechanical properties of the films, based on average of five samples of each film. Note that when embedding the PVOH compound, the tensile modulus is above 1200 MPa, which makes the polymer film brittle. When using the PVOH-g-PBS compound, there is only minor decrease in the tensile strength, the tensile elongation remains high, and the tensile modulus decrease to 600-1000 MPa, which makes the film more flexible and less rigid.

Figure 9A:
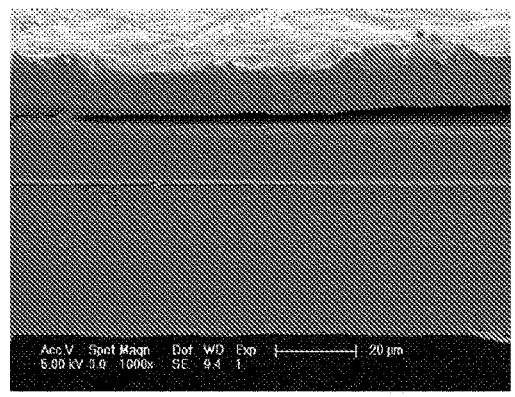
FIGS. 9A and 9B are SEM micrographs of Sheets #7 and #5 of Example 5, respectively.
Figure 9B:
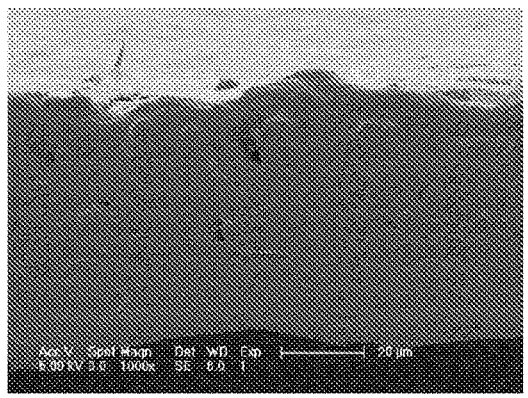

In order to demonstrate the benefits of the PVOH-g-PBS layer, which acts both as a tie layer (acting so as to inhibit the separation of the various layers of the film) and as a barrier layer, Scanning electron Microscope (SEM) analysis was performed using polymer sheet sections, that were sputter coated with Pd/Au for 60 seconds. The samples were analyzed using Sirion FEI High Resolution Scanning Electron Microscope. The results are presented in FIGS. 9A and 9B, wherein FIG. 9A is a micrograph of Sheet #7 of Example 5 and FIG. 9B is a micrograph of Sheet #5 of Example 5. as detailed above, the middle layer of Sheet #7 is a compound of PVOH, while the middle layer of Sheet #5 is a PVOH-g-PBS compound. As shown in FIGS. 9A and 9B, Sheet #7 demonstrated de-lamination of the dry film, while Sheet #5 demonstrated no de-lamination of the dry film. Other results have shown that the PVOH-g-PBS layer prevents de-lamination in both dry and wet conditions.

Example 6

The oxygen transmission rate (OTR) measurement was performed according to ASTM D3985-05(2010)e1: Standard Test Method for Oxygen Gas Transmission Rate Through Plastic Film and Sheeting using a coulometric sensor (MOCON OXYGEN PERMEABILITY METER, OXTRAN). The water vapor transmission rate (WVTR) was measured using a TNO/PIRA water permeability meter. The sheets related to in Example 6 are the same sheets related to in Example 5.

Sheet 1: The OTR value for 60 micron film thickness was 256 $[cm^3/(m^2 \cdot d \cdot bar)]$ at 25° C.
The WVTR value for 60 micron film thickness was 301 $[g/(m^2 \cdot d)]$ at 90% RH, at 38° C.

Sheet 2: The OTR value for 60 micron film thickness was 0.082 $[cm^3/(m^2 \cdot d \cdot bar)]$ at 25° C.
The WVTR value for 60 micron film thickness was 289 $[g/(m^2 \cdot d)]$ at 90% RH, at 38° C.

Sheet 3: The OTR value for 60 micron film thickness was 487 $[cm^3/(m^2 \cdot d \cdot bar)]$ at 25° C.
The WVTR value for 60 micron film thickness was 397 $[g/(m^2 \cdot d)]$ at 90% RH, at 38° C.

Sheet 4: The OTR value for 60 micron film thickness was 402 $[cm^3/(m^2 \cdot d \cdot bar)]$ at 25° C.
The WVTR value for 60 micron film thickness was 432 $[g/(m^2 \cdot d)]$ at 90% RH, at 38° C.

Sheet 5: The OTR value for 60 micron film thickness was calculated to be 190 $[cm^3/(m^2 \cdot d \cdot bar)]$ at 25° C.
The WVTR value for 60 micron film thickness was 367 $[g/(m^2 \cdot d)]$ at 90% RH, at 38° C.

Sheet 6: The OTR value for 60 micron film thickness was calculated to be 0.409 $[cm^3/(m^2 \cdot d \cdot bar)]$ at 25° C.
The WVTR value for 60 micron film thickness was 352 $[g/(m^2 \cdot d)]$ at 90% RH, at 38° C.

Sheet 7: The OTR value for 60 micron film thickness was calculated to be 0.41 $[cm^3/(m^2 \cdot d \cdot bar)]$ at 25° C.
The WVTR value for 60 micron film thickness was 307 $[g/(m^2 \cdot d)]$ at 90% RH, at 38° C.

Sheet 8: The OTR value for 60 micron film thickness was 374 $[cm^3/(m^2 \cdot d \cdot bar)]$ at 25° C.
The WVTR value for 60 micron film thickness was 339 $[g/(m^2 \cdot d)]$ at 90% RH, at 38° C.

Sheet 9: The OTR value for 60 micron film thickness was 329 [cm$^3$/(m$^2$·d·bar)] at 25° C.
The WVTR value for 60 micron film thickness was 328 [g/(m$^2$·d)] at 90% RH, at 38° C.

Water absorption was measured according to ASTM D570-98(2010)e1 standard test method for water absorption of plastics, modified for thin films. Water absorption for sheet #1 was 3.1% with STDEV of 0.5%. When Sheet #2 was tested for water absorption, the film failed due to layer separation and it was unmeasurable under wet conditions.

Sheets #6 and #7, failed within 24 hours immersed in water, due to layer separation. The water absorption for sheet #5 was 8.5% with STDEV of 0.8%. The water absorption for sheet #8 was 4.8% with STDEV of 0.5%. The results of sheets #3, #4 and #9 are detailed in Table 2 below.

Unlike sheets having a PVOH compound core layers, sheets having a POVH-g-PBS compound core layer present swelling and no de-lamination, keeping the structure stable even under wet conditions. The outer layers of those films are hydrophobic polymers, and therefore the inner core (tie) layer enables good interaction between layers and prevents de-lamination.

Table 2a-c: Permeability properties of the polymer sheets, OTR and WVTR, and water absorption of the polymer sheets TABLE 2a

| Sheet # | layer 1 | layer 2 | layer 3 | layer 4 | layer 5 | OTR [cm3/(m2·d·bar)] ASTM D3985 |
|---|---|---|---|---|---|---|
| 1 | PBSA/PLA | PVOH-g-PBS | PBSA/PLA | | | 256 |
| 2 | PBSA/PLA | PVOH | PBSA/PLA | | | 0.082 |
| 3 | PBSA/PLA | PBS | PBSA/PLA | | | 487 |
| 4 | PBSA/PLA | PBSA | PBSA/PLA | | | 402 |
| 5 | PBSA/PLA | PVOH-g-PBS | PVOH-g-PBS | PVOH-g-PBS | PBSA/PLA | |
| 6 | PBSA/PLA | PVOH-g-PBS | PVOH | PVOH-g-PBS | PBSA/PLA | |
| 7 | PBSA/PLA | PBSA/PLA | PVOH | PBSA/PLA | PBSA/PLA | |
| 8 | PBSA/PLA | PVOH-g-PBS | PBS | PVOH-g-PBS | PBSA/PLA | 374 |
| 9 | PBSA/PLA | PVOH-g-PBS | PBSA | PVOH-g-PBS | PBSA/PLA | 329 |

TABLE 2b

| Sheet # | layer 1 | layer 2 | layer 3 | layer 4 | layer 5 | WVTR [g/(m2·d)] ASTM E96 |
|---|---|---|---|---|---|---|
| 1 | PBSA/PLA | PVOH-g-PBS | PBSA/PLA | | | 301 |
| 2 | PBSA/PLA | PVOH | PBSA/PLA | | | 289 |
| 3 | PBSA/PLA | PBS | PBSA/PLA | | | 397 |
| 4 | PBSA/PLA | PBSA | PBSA/PLA | | | 432 |
| 5 | PBSA/PLA | PVOH-g-PBS | PVOH-g-PBS | PVOH-g-PBS | PBSA/PLA | 367 |
| 6 | PBSA/PLA | PVOH-g-PBS | PVOH | PVOH-g-PBS | PBSA/PLA | 352 |
| 7 | PBSA/PLA | PBSA/PLA | PVOH | PBSA/PLA | PBSA/PLA | 307 |
| 8 | PBSA/PLA | PVOH-g-PBS | PBS | PVOH-g-PBS | PBSA/PLA | 339 |
| 9 | PBSA/PLA | PVOH-g-PBS | PBSA | PVOH-g-PBS | PBSA/PLA | 328 |

TABLE 2c

| Sheet # | layer 1 | layer 2 | layer 3 | layer 4 | layer 5 | Water absorption [%] ASTM D570 |
|---|---|---|---|---|---|---|
| 1 | PBSA/PLA | PVOH-g-PBS | PBSA/PLA | | | 3.1 ± 0.5% |
| 2 | PBSA/PLA | PVOH | PBSA/PLA | | | Failed |
| 3 | PBSA/PLA | PBS | PBSA/PLA | | | −0.2 ± 0.1% |
| 4 | PBSA/PLA | PBSA | PBSA/PLA | | | −0.1 ± 0.0% |
| 5 | PBSA/PLA | PVOH-g-PBS | PVOH-g-PBS | PVOH-g-PBS | PBSA/PLA | 8.5 ± 0.8% |
| 6 | PBSA/PLA | PVOH-g-PBS | PVOH | PVOH-g-PBS | PBSA/PLA | Failed |
| 7 | PBSA/PLA | PBSA/PLA | PVOH | PBSA/PLA | PBSA/PLA | Failed |
| 8 | PBSA/PLA | PVOH-g-PBS | PBS | PVOH-g-PBS | PBSA/PLA | 4.8 ± 0.5% |
| 9 | PBSA/PLA | PVOH-g-PBS | PBSA | PVOH-g-PBS | PBSA/PLA | 5.0 ± 0.5% |

Table 2a-c demonstrates the OTR and WVTR of the multi layered films (Sheets #1-#9). Note that the OTR and WVTR of the films comprising a PVOH compound layer are lower than the corresponding values of all other sheets, and therefore, such sheets are appropriate for humid conditions. However, in the water absorption analysis, films comprising a PVOH compound layer failed due to selling and delamination. Films comprising a PVOH-g-PBS compound layer do not delaminate and significantly the sheet barrier properties.

Example 7

Sheet #10: A three layered biodegradable film with hydrophobically modified clay nano-particles for barrier compound.

A three layered film, wherein layers 1 and 3 are prepared from a compound of PBSA/PLA having a polymer ratio of 75/25% w/w, respectively, produced similarly to layers 1 and 3 of Sheet #1 of Example 5. Layer 2 is prepared from compound of PBSA with surface modified clay nano-particles. The final polymer sheet was produced according to the cast co-extrusion stage, as detailed above in Example 5.

The clay nano particles were processed in order to comply it with the biodegradable matrix/biodegradable sheet/film, and to assure the homogenous dispersion of the nanoclay in the polymer melt prepared while producing the sheets.
Initially, the clay was treated in a chemical hood, to exfoliate the particles, as described below.

Nano clay exfoliation stage: the following nano clay particles were used
Cloisite 30B

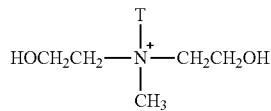

Exfoliated clay molecule, wherein T is tallow (~65% C18, ~30% C16, ~5% C14) and the anion is chloride.

The above nano-clay particles were initially dispersed in 100 ml toluene, with 100 microliter HCl 1M for 10 minutes, removing cations, such as $Na^+$ or $Ca^2$, under magnetic stirring. The particles were then washed with Dimethylformamide (DMF) three times. 100 ml of 3-(Dimethylamino)-1-propylamine (DMPA) were added with 150 ml DMF.
Next, the treated clay particles are organically modified, using conjugation molecule, as described hereunder.

Conjugation of bifunctional isocyanate: 10 ml hexamethylene diisocyanate (HDI) was conjugated to DMPA on the nanoclay surface. The free HDI isocyanate, reacted with the 10 grams of PBSA hydroxyl end group in the presence of Stannous(II)octoate (SnOct):

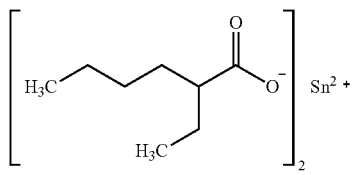

Stannous(II)octoate (SnOct)
The final polymer sheet was produced according to the cast co-extrusion stage of Example 5, as detailed above.

Sheet #11: A three layered biodegradable film with hydrophobically modified clay nano-particles for barrier compound A three layered film, wherein layers 1 and # are prepared from a compound of PBSA/PLA having a polymer ratio of 75/25% w/w, respectively, produced similarly to layers 1 and 3 of Sheet #1 (Example 5), and a middle layer comprising a compound of 40% w/w nanoclay concentrate compounded with 60% w/w PBS. The final polymer sheet was produced according to the cast co-extrusion, as detailed above in Example 5. The clay nano particles were processed in order to comply it with the biodegradable matrix/biodegradable sheet/film, and to assure the homogenous dispersion of the nanoclay in the polymer melt prepared while producing the sheets.
Initially, the clay was treated in a chemical hood, to exfoliate the particles, and were further processed as follows:

Hydrophobically Modified Clay Nano Particles Using Ring Opening Polymerization (Preparing Nanoclay Concentrate)

epsilon-caprolacton and L-lactide were polymerized by ring opening polymerization (ROP). 100 grams of Cloisite C30B were introduced into a 1 liter flask. 400 gram of epsilon-caprolacton, and 50.8 grams of L-lactide, to make random copolymer of poly(caprolacton-co-L-lactide) (PCLA), were added to the flask and mechanically stirred until all the clay was fully dispersed. 28.5 grams of SnOct were added with 300 ml of DMF and 100 ml of Dioxane. The flask was connected to a reflux condenser and cooled to 0° C. The flask was then heated to 160° C., in a silicone oil bath for 8 hours, under mechanical stirring. Post reaction, 100 ml of Dioxane was added, and the solution of nano clay with poly(caprolacton-co-L-lactide) (PCLA) was precipitated into beaker with 1000 ml petroleum ether 40-60 C. The solid precipitation was collected, and dried initially in the hood, overnight, and later in a vacuum oven, to remove all solvent residues. The solid precipitation prepared is a nanoclay concentrate having 25% w/w of nanoclay particles. In order for the final middle layer of the sheet to have 10% nanoclay particles, the middle layer was prepared from 40% of the nanoclay concentrate and 60% of the biodegradable polymer.

A dry mix with of 6.0 kg PBS and 4.0 kg of nanoclay-PCLA concentrate, prepared as detailed above, were compounded using a double arm sigma blade mixer with an extrusion screw (mixtruder). The mixer container was heated to 230° C., and the blades mixed the polymers for 10 minutes. The screw and pump head were heated to 220° C.
Cast co-extrusion stage:
1. The melt extruded materials were dried overnight at a temperature of 50° C. on a Shini SCD-160U-120H dryer;
2. The material were placed into a Collin co-extrusion lines, and set to the following profile:
Extruder A) 190-200-220° C.—200° C.—Adaptor; 220° C.—feedblock; Die—210° C.; screw speed: 80 rpm
Extruder B) 150-160-180° C.—180° C.—Adaptor; 185° C.—feedblock; Die—185° C.; screw speed: 45 rpm
Extruder C) 190-200-220° C.—200° C.—Adaptor; 220° C.—feedblock; Die—210° C.; screw speed: 80 rpm
Head pressure 50 bar.

The measured physical properties of Sheet #11 were as follows: Tensile strength at break was 26 Mpa, the Strain at Break was 190% and Young's Modulus was 821 Mpa.

Sheet #12: A three layered biodegradable film with hydrophobically modified clay nano-particles for barrier compound.

A three layered film, wherein layers 1 and 3 are prepared from a compound of PBSA/PLA having a polymer ratio of 75/25% w/w, respectively, produced similar to layers 1 and 3 of Sheet #1 (Example 5). Layer 2 was prepared from a compound of 40% w/w nanoclay concentrate, prepared using the same procedure described above for Sheet #11, compounded with 60% w/w PBSA. The final polymer sheet was produced according to the cast co-extrusion stage, as detailed in Example 5. The clay nano particles were processed in order to comply it with the biodegradable matrix/biodegradable sheet/film, and to assure the homogenous dispersion of the nanoclay in the polymer melt prepared while producing the sheets.

The clay nano particles were treated and conjugated with the PCLA polymer as detailed regarding Sheet #11.

The measured physical properties of Sheet #12 were as follows: Tensile strength at break was 24 Mpa, the Strain at Break was 193% and Young's Modulus was 509 Mpa.

Sheet #13: A five layered biodegradable film with hydrophobically modified clay nano-particles for barrier compound, and hygroscopic oxygen and water barrier A five layered film, wherein layers 1 and 5 were prepared from a compound of PBSA/PLA having a polymer ratio of 75/25% w/w, respectively, produced similarly to layers 1 and 3 of Sheet #1 (Example). Layers 2 and 4 were prepared from a compound of PVOH-g-PBS, prepared using the same procedure described above for Sheet #1 (Example 5). Layer 3 was prepared from a compound of 40% w/w nanoclay concentrate, using the same procedure described above for Sheet #11, in a compound with 60% w/w PBS.

The measured physical properties of Sheet #13 were as follows: Tensile strength at break was 30 Mpa, the Strain at Break was 109% and Young's Modulus was 623 Mpa. Table 3a-c: Summary of the mechanical properties for the multi-layered polymer sheets. The details of Sheets #3, #4, and #8 are detailed in Example 5 above.

TABLE 3a

| Sheet # | layer 1 | layer 2 | layer 3 | layer 4 | layer 5 | Tensile Strength @ Break, MD (MPa) ASTM D882 |
|---|---|---|---|---|---|---|
| 11 | PBSA/PLA | PBS NC-PCLA | PBSA/PLA | | | 26 |
| 3 | PBSA/PLA | PBS | PBSA/PLA | | | 33 |
| 12 | PBSA/PLA | PBSA NC-PCLA | PBSA/PLA | | | 22 |
| 4 | PBSA/PLA | PBSA | PBSA/PLA | | | 28 |
| 13 | PBSA/PLA | PVOH-g-PBS | PBS NC-PCLA | PVOH-g-PBS | PBSA/PLA | 30 |
| 8 | PBSA/PLA | PVOH-g-PBS | PBS | PVOH-g-PBS | PBSA/PLA | 33 |

TABLE 3b

| Sheet # | layer 1 | layer 2 | layer 3 | layer 4 | layer 5 | Tensile Elongation, MD % ASTM D882 |
|---|---|---|---|---|---|---|
| 11 | PBSA/PLA | PBS NC-PCLA | PBSA/PLA | | | 190 |
| 3 | PBSA/PLA | PBS | PBSA/PLA | | | 214 |
| 12 | PBSA/PLA | PBSA NC-PCLA | PBSA/PLA | | | 241 |
| 4 | PBSA/PLA | PBSA | PBSA/PLA | | | 203 |
| 13 | PBSA/PLA | PVOH-g-PBS | PBS NC-PCLA | PVOH-g-PBS | PBSA/PLA | 109 |
| 8 | PBSA/PLA | PVOH-g-PBS | PBS | PVOH-g-PBS | PBSA/PLA | 53 |

TABLE 3c

| Sheet # | layer 1 | layer 2 | layer 3 | layer 4 | layer 5 | Tensile Modulus, MD (MPa) ASTM D882 |
|---|---|---|---|---|---|---|
| 11 | PBSA/PLA | PBS NC-PCLA | PBSA/PLA | | | 821 |
| 3 | PBSA/PLA | PBS | PBSA/PLA | | | 619 |
| 12 | PBSA/PLA | PBSA NC-PCLA | PBSA/PLA | | | 627 |
| 4 | PBSA/PLA | PBSA | PBSA/PLA | | | 426 |
| 13 | PBSA/PLA | PVOH-g-PBS | PBS NC-PCLA | PVOH-g-PBS | PBSA/PLA | 623 |
| 8 | PBSA/PLA | PVOH-g-PBS | PBS | PVOH-g-PBS | PBSA/PLA | 700 |

As shown in table 3a-c, the composite materials forming the polymer and clay nano-particles compound, enhance the mechanical properties of the sheet, without significantly decreasing the tensile strength (range of 24-33 MPa for all the compounds) thereof. Further, the tensile modulus is increased (426-700 for compound without the nanoclay-PCLA (NC-PCLA), and 509-821 MPa for NC-PCLA containing compound). The outcome is that for a similar application a thinner wall thickness is required.

Example 8

The oxygen transmission rate (OTR) was measured according to ASTM D3985-05(2010)e1: Standard Test Method for Oxygen Gas Transmission Rate Through Plastic Film and Sheeting using a coulometric sensor. The equipment used was MOCON OXYGEN PERMEABILITY METER, OXTRAN. The water vapor transmission rate (WVTR) was measured using a TNO/PIRA water permeability meter.

Sheet 11: The measured oxygen transmission rate (OTR) (ASTM D3985-05(2010)e1) The OTR value for 60 micron film thickness was 464 [$cm^3/(m^2 \cdot d \cdot bar)$] at 25° C.
The WVTR value for 60 micron film thickness was 330 [$g/(m^2 \cdot d)$] at 90% RH, at 38° C.
Sheet 12: The OTR value for 60 micron film thickness was 544 [$cm^3/(m^2 \cdot d \cdot bar)$] at 25° C.
The WVTR value for 60 micron film thickness was 340 [$g/(m^2 \cdot d)$] at 90% RH, at 38° C.
Sheet 13: The OTR value for 60 micron film thickness was 282 [$cm^3/(m^2 \cdot d \cdot bar)$] at 25° C.
The WVTR value for 60 micron film thickness was 335 [$g/(m^2 \cdot d)$] at 90% RH, at 38° C.

Table 4 a and b: Permeability properties of the multi layered polymer sheets, OTR and WVTR.

Table 4 a and b summarizes the OTR and WVTR of the multilayered sheets. The nano clay-PCLA particles, acting as a passive barrier, enable reduction of the OTR between about 5-25%, and the WVTR by about 20%, both in three and in the five layer sheets. The five layered sheets enable the combination of a compound of PVOH-g-PBS, that functions both as oxygen and water barrier/scavenger, and as a tie layer that is both is compatible with its neighbor layers, with the core layer comprising the nanoclay particles. In addition, such films are stable even under wet conditions.

Example 9

Figure 10:
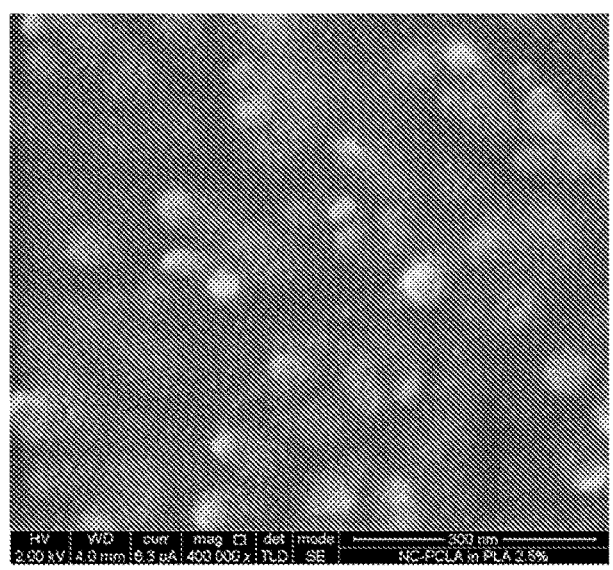
FIG. 10 is a SEM micrograph of nanoclay-PCLA dispersed in a PLA matrix.

The nanoclay particles treated with ROP, as detailed above, were dispersed homogenously in the polymer matrix as demonstrated in the SEM micrograph in FIG. 10, due to their unique surface polymerization with the PCLA polymer and a sheet (Sheet #12) was prepared therefrom, as detailed above The polymer low melting point, of 60° C., enables good dispersion of the conjugated clay particles in the polymer melt, and therefore it actually acts as a plasticizer. In addition, the polymers formed perpendicular to the clay surface are biodegradable polyesters that enable full degradation, to the dispersed particles. The out coming sheet containing the nanoclay particles is homogenous and uniform. In order to generate the SEM micrograph, the polymer sheet was lyophilized, sectioned and sputter coated with Pd/Au. Extra high resolution scanning electron microscope, Magellan 400L, was used to analyze the clay nano particle dispersion.

Example 10

Additional Treatments of Nanoclay Particles

Procedure A: The clay nano particles were processed in order to comply it with the biodegradable matrix/biodegrad- TABLE 4a

| Sheet # | layer 1 | layer 2 | layer 3 | layer 4 | layer 5 | OTR [cm3/(m2 · d · bar)] ASTM D3985 |
|---|---|---|---|---|---|---|
| 11 | PBSA/PLA | PBS NC-PCLA | PBSA/PLA | | | 464 |
| 3 | PBSA/PLA | PBS | PBSA/PLA | | | 487 |
| 12 | PBSA/PLA | PBSA NC-PCLA | PBSA/PLA | | | 375 |
| 4 | PBSA/PLA | PBSA | PBSA/PLA | | | 402 |
| 13 | PBSA/PLA | PVOH-g-PBS | PBS NC-PCLA | PVOH-g-PBS | PBSA/PLA | 282 |
| 8 | PBSA/PLA | PVOH-g-PBS | PBS | PVOH-g-PBS | PBSA/PLA | 374 |

TABLE 4b

| Sheet # | layer 1 | layer 2 | layer 3 | layer 4 | layer 5 | WVTR [g/(m2 · d)] ASTM E96 |
|---|---|---|---|---|---|---|
| 11 | PBSA/PLA | PBS NC-PCLA | PBSA/PLA | | | 330 |
| 3 | PBSA/PLA | PBS | PBSA/PLA | | | 397 |
| 12 | PBSA/PLA | PBSA NC-PCLA | PBSA/PLA | | | |
| 4 | PBSA/PLA | PBSA | PBSA/PLA | | | 432 |
| 13 | PBSA/PLA | PVOH-g-PBS | PBS NC-PCLA | PVOH-g-PBS | PBSA/PLA | 335 |
| 8 | PBSA/PLA | PVOH-g-PBS | PBS | PVOH-g-PBS | PBSA/PLA | 339 | able sheet/film, and to assure the homogenous dispersion of the nanoclay in the polymer melt prepared while producing the sheets.

The nano clay particles are initially treated with acid as described in respect to Sheet #10 above.

Next, the treated clay particles are organically modified, using conjugation molecule, as follows:

Conjugation of a heterobifunctional molecule stage: isocyanatoproyl-triethoxy-silane (ICN-TES) (20 ml/10 g NC), was reacted with the nanoclay surface siloxyl groups, for 36 hours at 80° C. in dry toluene (20 ml) under magnetic stirring. Next, 10 grams of isocyanate were reacted with the polymer hydroxyl end group, with added 0.2 gram of SnOct at 80° C., for 4 hours.

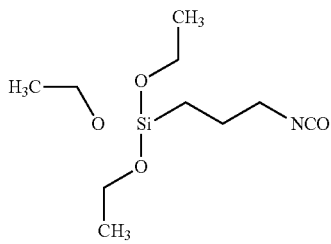

isocyanatoproyl-triethoxy-silane (ICN-TES)

Procedure B: The clay nano particles were processed in order to comply it with the biodegradable matrix/biodegradable sheet/film, and to assure the homogenous dispersion of the nanoclay in the polymer melt prepared while producing the sheets.

The nano clay particles are initially treated with acid as described in regarding Sheet #10 above.

Next, the treated clay particles were organically modified, using conjugation molecule, as follows:

Conjugation of a heterobifunctional molecule stage: 3-aminopropyl)triethoxysilane (APTES) (20 ml/10 g NC) was reacted for 36 hours at 80° C. in dry Dioxane (20 ml) under magnetic stirring, prepared using the same procedure described above for ICN-TES. Next, hexmethylene diisocyanate (HDI) was reacted with APTES in dry dioxane, at 40° C., under magnetic stirring with 100 micro-liter of SnOct. Next, the isocyanate group reacted with the polymer's hydroxyl end group, in the presence of the SnOct, at 80° C., for 4 hours.

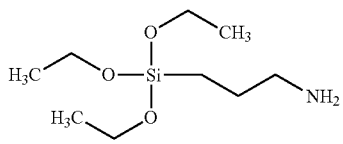

3-aminopropyl)triethoxysilane (APTES)—reacts with the nanoclay surface siloxyl group

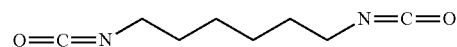

hexmethylene diisocyanate (HDI)—reacts with the free amino group.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A multilayered biodegradable sheet, wherein at least one layer comprises at least one biodegradable polymer and surface treated nanoclay particles, comprising a bridge between the surface treated nanoclay particles and the biodegradable polymer, said bridge comprising a functional moiety having at least two functional sites, wherein at least one of the functional sites is conjugated to the nanoclay particle surface and at least another one of the functional sites is conjugated to the biodegradable polymer; and the nanoclay particles are optionally homogeneously dispersed in the at least one layer.

2. The multilayered biodegradable sheet according to claim 1, wherein the bridge comprises a first end and a second end and a plurality of functional moieties, each functional moiety having at least two functional sites, wherein at least one of the functional sites is conjugated to the nanoclay particle surface and at least one of the functional sites of a second moiety on the second end of the bridge is conjugated to the biodegradable polymer.

3. The multilayered biodegradable sheet according to claim 1, wherein the surface treated nanoclay particles are a nanoclay concentrate, wherein the nanoclay concentrate is optionally prepared by ring opening polymerization (ROP) and optionally wherein the ROP includes polymerizing ring bearing monomers selected from L-lactide, D-lactide, D,L-lactide and epsilon-caprolacton or a combination thereof.

4. The multilayered biodegradable sheet according to claim 1, wherein the surface treated nanoclay particles comprise a step of pretreatment to remove ions adsorbed on the surface of the nanoclay particles.

5. The multilayered biodegradable sheet according to claim 1, wherein the functional moiety comprises
   a) 3-(dimethylamino)-1-propylamine (DMPA), a diisocyanante group, triethoxysilane substituted with an isocyanate group, aminopropyl triethoxysilane or any combination thereof; or
   b) a functional group selected from a di-aldehyde selected from gluteraldehyde, diacrylate, meta-acrylate, or di-epoxide, or a diisocyanate group is selected from hexamethylene diisocyanate (HDI), methylene diphenyl diisocyanate (MDI) or toluene diisocyanate (TDI).

6. The multilayered biodegradable sheet according to claim 1, wherein the sheet comprises 1-30% w/w of a nanoclay concentrate.

* * * * *